US010257314B2

(12) United States Patent
Agrawal et al.

(10) Patent No.: US 10,257,314 B2
(45) Date of Patent: Apr. 9, 2019

(54) END-TO-END USER EXPERIENCES WITH A DIGITAL ASSISTANT

(71) Applicant: Microsoft Technology Licensing, LLC, Redmond, WA (US)

(72) Inventors: Abhishek Agrawal, Bellevue, WA (US); Fnu Anupam, Bellevue, WA (US); Vanshika V. Sinha, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 160 days.

(21) Appl. No.: 15/189,568

(22) Filed: Jun. 22, 2016

(65) Prior Publication Data

US 2017/0374176 A1     Dec. 28, 2017

(51) Int. Cl.
*H04L 29/08* (2006.01)
*H04W 4/00* (2018.01)
*H04L 12/58* (2006.01)
(Continued)

(52) U.S. Cl.
CPC .............. *H04L 67/327* (2013.01); *G06F 8/31* (2013.01); *G06F 9/44526* (2013.01);
(Continued)

(58) Field of Classification Search
CPC ..... H04L 51/046; H04L 67/327; H04L 67/36; H04W 4/008; H04W 4/021; H04W 12/06;
(Continued)

(56) References Cited

U.S. PATENT DOCUMENTS 9,147,191 B2    9/2015 Cohen et al.
9,361,630 B1 *  6/2016 Goswami ........... G06Q 30/0267
(Continued)

FOREIGN PATENT DOCUMENTS

EP     2706763 A1    3/2014
WO     2014000285 A1  1/2014

OTHER PUBLICATIONS

Jansen, et al., "Proximity-based Authentication for Mobile Devices", In Proceedings of the International Conference on Security and Management, Jun. 20, 2005, (7 pages total).
"International Search Report and Written Opinion Issued in PCT Application No. PCT/US2017/036933", dated Nov. 6, 2017, 19 pages.

*Primary Examiner* — Abdullahi E Salad
(74) *Attorney, Agent, or Firm* — Mark K. Young; Mayer & Williams PC

(57) ABSTRACT

A digital assistant supported across devices such as smartphones, tablets, personal computers, wearable computing devices, game consoles, and the like includes an end-to-end user experience client that interfaces with extensions to applications and/or remote cloud-based services so that user experiences, content, or features can be integrated with the digital assistant and rendered as a native digital assistant user experience. The digital assistant is configured to perform as an active participant in a user experience from its initiation to its conclusion (i.e., from "end-to-end") by determining the user's intent, performing tasks and actions, providing status, and interacting with the user as needed. The digital assistant utilizes proximity sensing so that its end-to-end participation in a user experience may span different physical locations. Such capability can facilitate the performance of location-specific actions including authenticating the user to gain access to locations, information, or services that would be restricted from non-authenticated users.

20 Claims, 20 Drawing Sheets

(51) Int. Cl.
  *H04W 12/06* (2009.01)
  *H04W 4/02* (2018.01)
  *H04W 4/021* (2018.01)
  *G06F 8/30* (2018.01)
  *G06F 9/445* (2018.01)
  *G06F 17/30* (2006.01)
  *G06Q 10/10* (2012.01)
  *H04W 4/80* (2018.01)
  *G06F 9/451* (2018.01)

(52) U.S. Cl.
  CPC ......... *G06F 17/3087* (2013.01); *G06Q 10/10* (2013.01); *H04L 51/046* (2013.01); *H04L 67/36* (2013.01); *H04W 4/021* (2013.01); *H04W 4/80* (2018.02); *H04W 12/06* (2013.01); *G06F 9/453* (2018.02)

(58) Field of Classification Search
  CPC ....... G06Q 10/10; G06F 8/31; G06F 9/44526; G06F 17/3087; G06F 9/4446
  See application file for complete search history.

(56) References Cited

U.S. PATENT DOCUMENTS

| | | |
|---|---|---|
| 2010/0268768 A1* | 10/2010 | Kurtenbach ........ H04L 67/1097 709/203 |
| 2011/0289015 A1 | 11/2011 | Mei et al. |
| 2013/0326587 A1 | 12/2013 | Zhu et al. |
| 2014/0195968 A1 | 7/2014 | Banavara |
| 2014/0222503 A1 | 8/2014 | Vijayaraghavan et al. |
| 2014/0365209 A1* | 12/2014 | Evermann ............. G06F 17/279 704/9 |
| 2015/0039580 A1 | 2/2015 | Subhedar |
| 2015/0168150 A1 | 6/2015 | Kahn et al. |
| 2015/0178652 A1* | 6/2015 | Schulz ............ G06Q 10/06315 705/7.25 |
| 2016/0379105 A1* | 12/2016 | Moore, Jr. ............. G06N 3/006 706/11 |
| 2017/0068423 A1* | 3/2017 | Napolitano .......... G06F 3/04842 |
| 2017/0132019 A1* | 5/2017 | Karashchuk .......... G06F 3/0482 |

* cited by examiner

END-TO-END USER EXPERIENCES WITH A DIGITAL ASSISTANT

BACKGROUND

Digital assistants can provide a variety of features for device users and can make it easier to interact with devices to perform tasks, get information, and stay connected with friends and colleagues using voice interactions and other inputs. Digital assistants are sometimes referred to as "virtual assistants."

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A digital assistant supported across devices such as smartphones, tablets, personal computers (PCs), wearable computing devices, game consoles, and the like includes an end-to-end user experience client that interfaces with extensions to applications and/or remote cloud-based services so that various user experiences, content, or features can be integrated with the digital assistant and rendered as a native digital assistant user experience. The digital assistant is configured to perform as an active participant in a user experience from its initiation to its conclusion (i.e., from "end-to-end"), for example, by determining the user's intent, performing tasks and actions, providing status, and interacting with the user as needed. The digital assistant utilizes proximity sensing so that its end-to-end participation in a user experience may span different physical locations. Such capability can facilitate the performance of location-specific actions including authenticating the user to gain access to locations, information, or services that would be restricted from non-authenticated users. The digital assistant's end-to-end participation in user experiences increases its ability to provide comprehensive assistance to the user while saving the user time and effort.

In an illustrative example, a user may utilize an instance of the digital assistant on a home PC to interact with third-party applications and services to discover new movies, read movie reviews, find show times, invite friends to the movie, buy a ticket, and then book a ride to the theater with a ride-hailing service. The user can interact with another instance of the digital assistant on a smartphone during the ride to the movie theater. Proximity sensing is utilized to detect the user's subsequent arrival at the theater which triggers another instance of the digital assistant on the user's wearable computing device such as head-mounted display device or smartwatch to interact with the theater ticket application or service so that the user may be authenticated as a valid ticket holder. The location-specific authentication is "hands-free" which means the user can gain entry to the theater without having to perform additional actions. The digital assistant's participation in the user's movie experience is seamless from end to end and lets the user skip lines and other processes to be authenticated as a valid ticket holder. The digital assistant provides a consistent and reliable resource to the user and can save the user from having to work directly with applications and services which may employ disparate and inconsistent user interfaces.

The digital assistant's end-to-end participation in user experiences enables increased user efficiency when utilizing the digital assistant to obtain information and perform tasks, and may also improve overall user interaction performance with the device. The location-specific authentication using proximity detection lets users extend their use of the digital assistant all the way to the logical completion of a particular user experience. Such location-specific authentication using proximity sensing also provides an effective solution to the "last mile" gap left by conventional digital assistants that typically stop short in supporting location-specific services.

In addition, by broadening the information database that is available to the digital assistant, the extensibility to applications and services (which can include first and third-party applications and services) can improve the quality of answers and information that is provided to a user and may enable a wider and more comprehensive set of responses and actions to be supported by the digital assistant. Such information breadth can help to reduce the number of attempts required to obtain needed information and to provoke a desired action which lowers the likelihood of mistaken inputs to the device that can cause additional resource consumption and user frustration. The automated hands-free authentication provided by the digital assistant can also be expected to be more efficient than manual authentication operations performed by a user that may be time consuming and prone to error. Such increased efficiency may enable the device to efficiently utilize available computing resources including network bandwidth, processing cycles, memory, and battery life in some cases.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
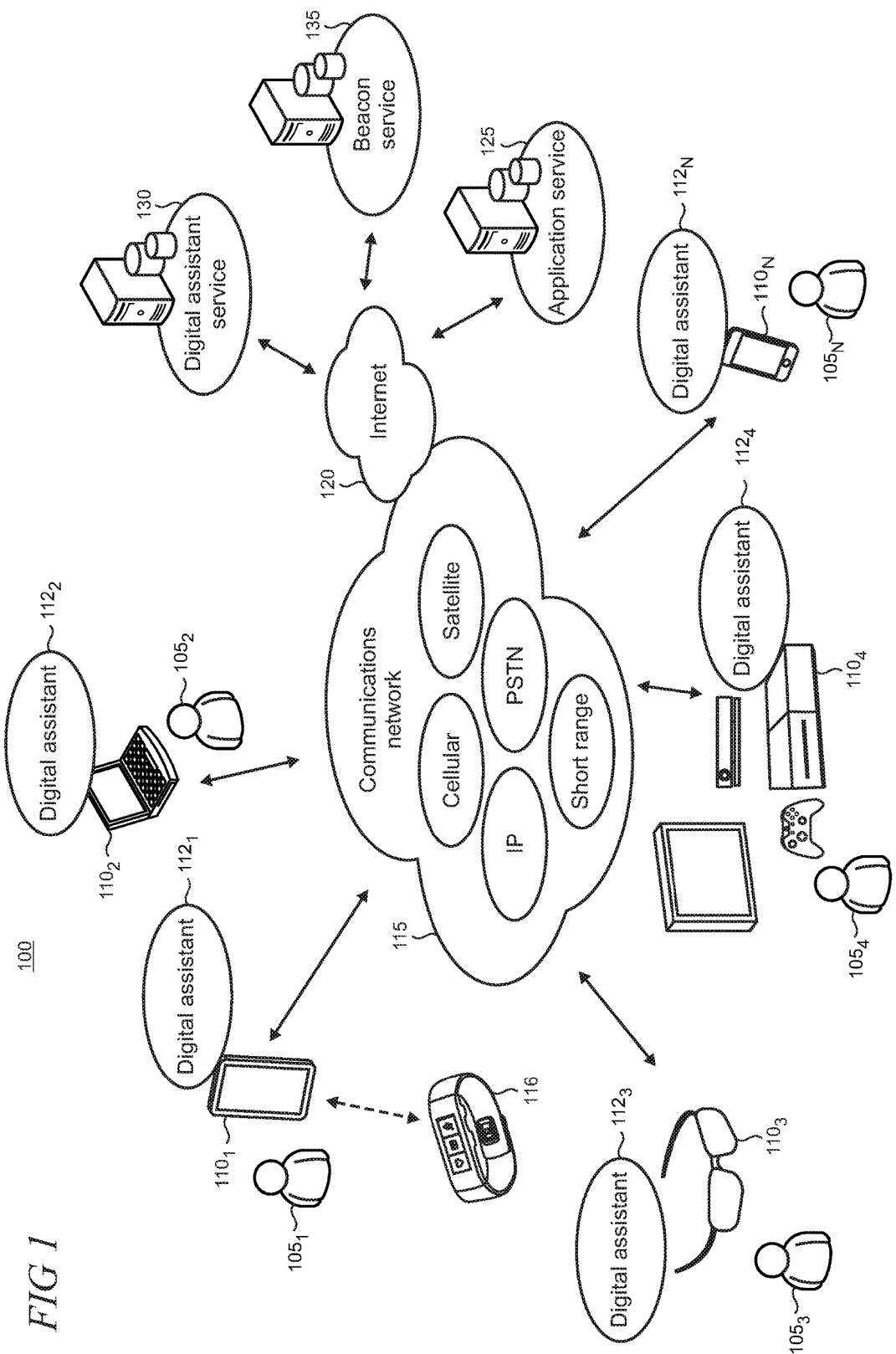
FIG. 1 shows an illustrative computing environment in which devices can communicate and interact with application services over a network.

FIG. 1 shows an illustrative environment 100 in which the same or different users 105 may employ various devices 110 that communicate over a network 115. Each device 110 may include an instance of a digital assistant 112. The devices 110 can support voice telephony capabilities in some cases and typically support data-consuming applications such as Internet browsing and multimedia (e.g., music, video, etc.) consumption in addition to various other features. The devices 110 may include, for example, user equipment, mobile phones, cell phones, feature phones, tablet computers, and smartphones which users often employ to make and receive voice and/or multimedia (i.e., video) calls, engage in messaging (e.g., texting) and email communications, use applications and access services that employ data, browse the World Wide Web, and the like.

Other types of electronic devices are also envisioned to be usable within the environment 100 including handheld computing devices, PDAs (personal digital assistants), portable media players, devices that use headsets and earphones (e.g., Bluetooth-compatible devices), phablet devices (i.e., combination smartphone/tablet devices), wearable computing devices such as head-mounted display (HMD) systems and smartwatches, navigation devices such as GPS (Global Positioning System) systems, laptop PCs (personal computers), desktop computers, multimedia consoles, gaming systems, or the like. In the discussion that follows, the use of the term "device" is intended to cover all devices that are configured with communication capabilities and are capable of connectivity to the communications network 115.

The various devices 110 in the environment 100 can support different features, functionalities, and capabilities (here referred to generally as "features"). Some of the features supported on a given device can be similar to those supported on others, while other features may be unique to a given device. The degree of overlap and/or distinctiveness among features supported on the various devices 110 can vary by implementation. For example, some devices 110 can support touch controls, gesture recognition, and voice commands, while others may enable a more limited user interface. Some devices may support video consumption and Internet browsing, while other devices may support more limited media handling and network interface features.

Accessory devices 116, such as wristbands and other wearable computing devices may also be present in the environment 100. Such accessory device 116 typically is adapted to interoperate with a coupled device 110 using a short range communication protocol like Bluetooth to support functions such as monitoring of the wearer's physiology (e.g., heart rate, steps taken, calories burned, etc.) and environmental conditions (temperature, humidity, ultra-violet (UV) levels, etc.), and surfacing notifications from the coupled device 110. Some accessory devices can be configured to work on a standalone basis (i.e., without relying on a coupled device 110 for functionality such as Internet connectivity) as wearable computing devices that may support an operating system and applications.

The devices 110 can typically utilize the network 115 in order to access and/or implement various user experiences. The network can include any of a variety of network types and network infrastructure in various combinations or sub-combinations including cellular networks, satellite networks, IP (Internet-Protocol) networks such as Wi-Fi under IEEE 802.11 and Ethernet networks under IEEE 802.3, a public switched telephone network (PSTN), and/or short range networks such as Bluetooth® networks. The network infrastructure can be supported, for example, by mobile operators, enterprises, Internet service providers (ISPs), telephone service providers, data service providers, and the like.

The network 115 may utilize portions of the Internet 120 or include interfaces that support a connection to the Internet so that the devices 110 can access content and render user experiences provided by various remote or cloud-based application services (representatively indicated by reference numeral 125). The application services 125 can respectively support a diversity of applications such as social networking, mapping, news and information, entertainment, travel, productivity, finance, etc. A digital assistant service 130 and beacon service 135 (each described in more detail below) are also present in the computing environment 100.

Figure 2:
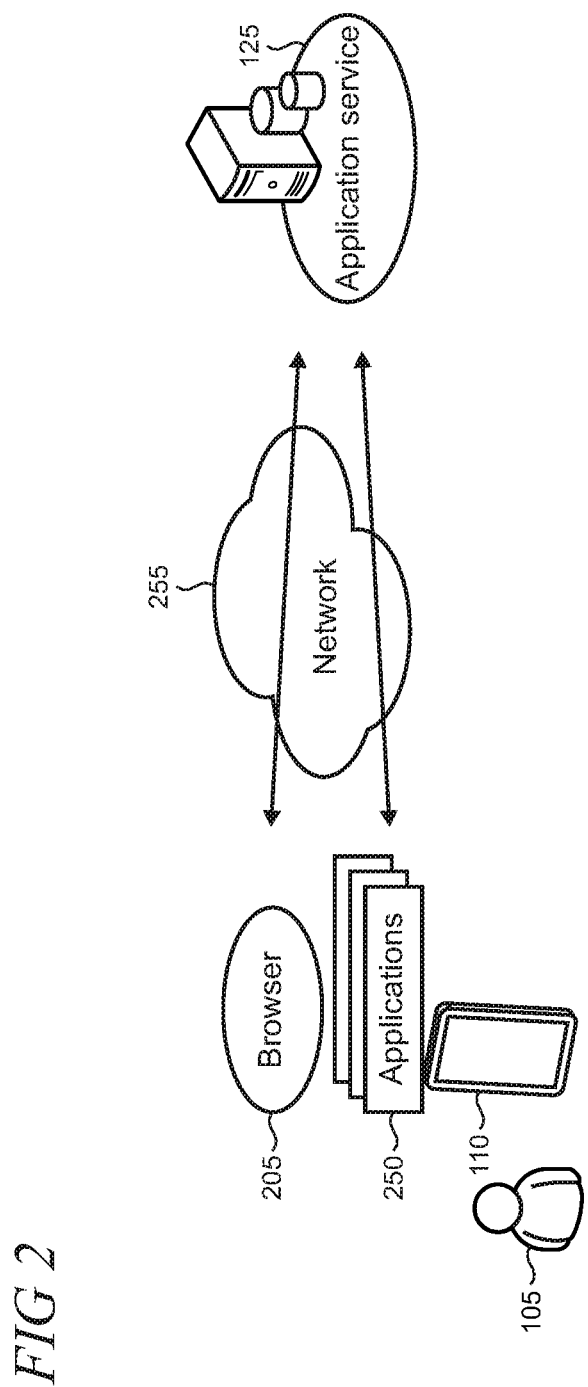
FIG. 2 shows a local application and/or a browser interacting with a remote application service.

As shown in FIG. 2, a device 110 can include local components such as a browser 205 and/or one or more applications 250 that can facilitate interaction with one or more remote application services 125. For example, in some scenarios, a user 105 may launch a locally executing application that communicates over a network 255 (e.g., network 115 and/or Internet 120 in FIG. 1) to an application service 125 in order to retrieve data and obtain services to enable various features and functions, provide information, and/or support user experiences that can be supported on various ones of the user interfaces on a local device 110 such as graphical user interfaces and audio user interfaces. In some use scenarios and/or at different times, an application 250 may operate locally on the device without needing to interface with a remote service.

In conventional application usage scenarios (i.e., those not involving the present end-to-end user experiences with a digital assistant), a user 105 may need to employ and interact with several applications 250 over the course of a particular user experience. For example, to start and complete a typical user experience such as going to the movies, the user 105 may employ one or more devices 110 and interact with various different applications and services. For example, the user may employ a first application to discover new movies, a second application to read reviews, and a third application to find movie show times and purchase a ticket. The user employs a fourth application to book a ride-hailing service for a car trip to the movie. The applications may employ disparate user interfaces that do not generally operate in a consistent or predictable manner across applications which can generate extra work for the user and may give rise to user input and other errors. In addition, the applications may not facilitate particular location-specific user experiences. Once at the movie theater, for example, the user may need to pull out her smartphone and employ an application to retrieve a ticket having a barcode or similar device that can be displayed to a human operator or optical scanner so that the user can be authenticated as a valid ticket holder and enter the theater.

Figure 3:
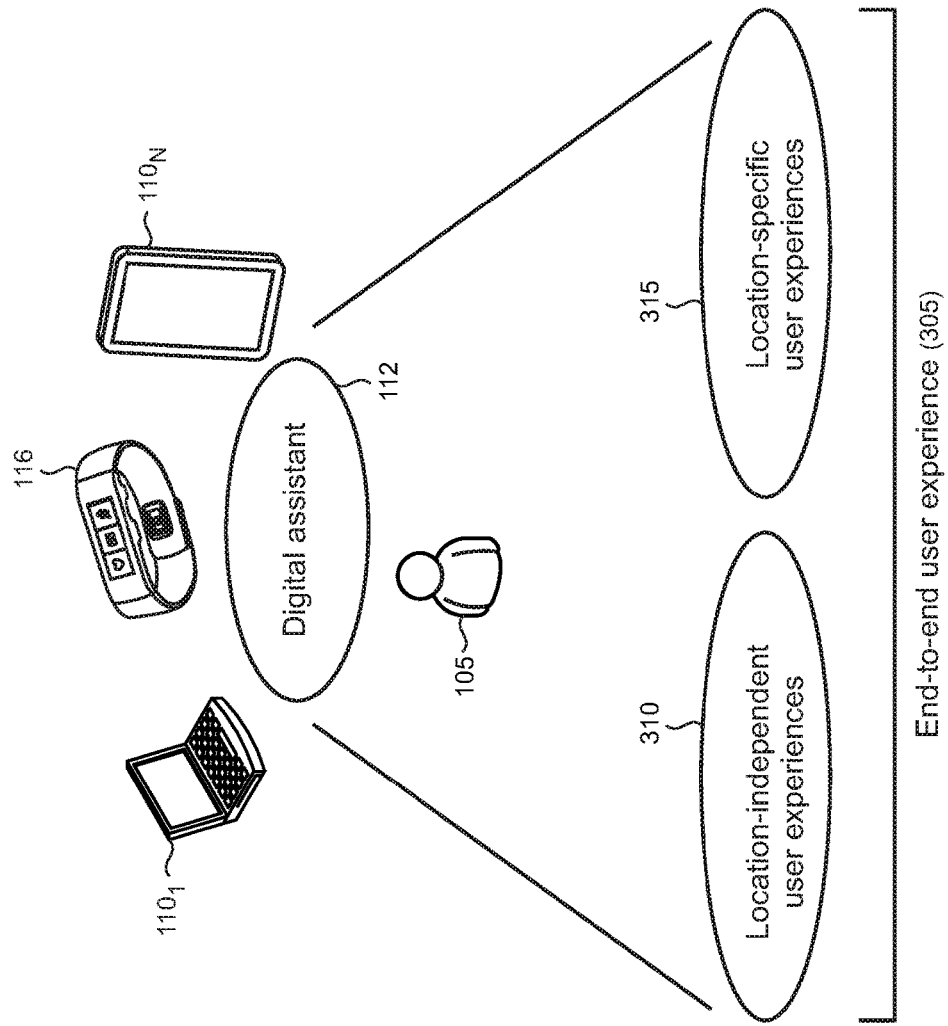
FIG. 3 shows an end-to-end user experience supported by a digital assistant that includes location-independent user experiences and location-specific user experiences.

In contrast to the conventional application usage scenarios, the user in the present end-to-end user experiences can utilize a single consistent user interface to the digital assistant. The digital assistant, in turn, can then interact with various applications and services on the user's behalf to render a more seamless end-to-end user experience with less effort by the user. As shown in FIG. 3, a given end-to-end user experience 305 may include location-independent user experiences 310 and location-specific user experiences 315. The user 105 interacts with the digital assistant 112 which can be instantiated on a single device 110, or on multiple devices. The digital assistant 112 is configured as an active participant across the user experiences 310 and 315 from start to finish. The user experiences 310 and 315 can occur one or more times in various order or sequence within a given end-to-end user experience 305. Thus, an end-to-end user experience 305 can be described using dimensions of time and/or location.

Figure 4:
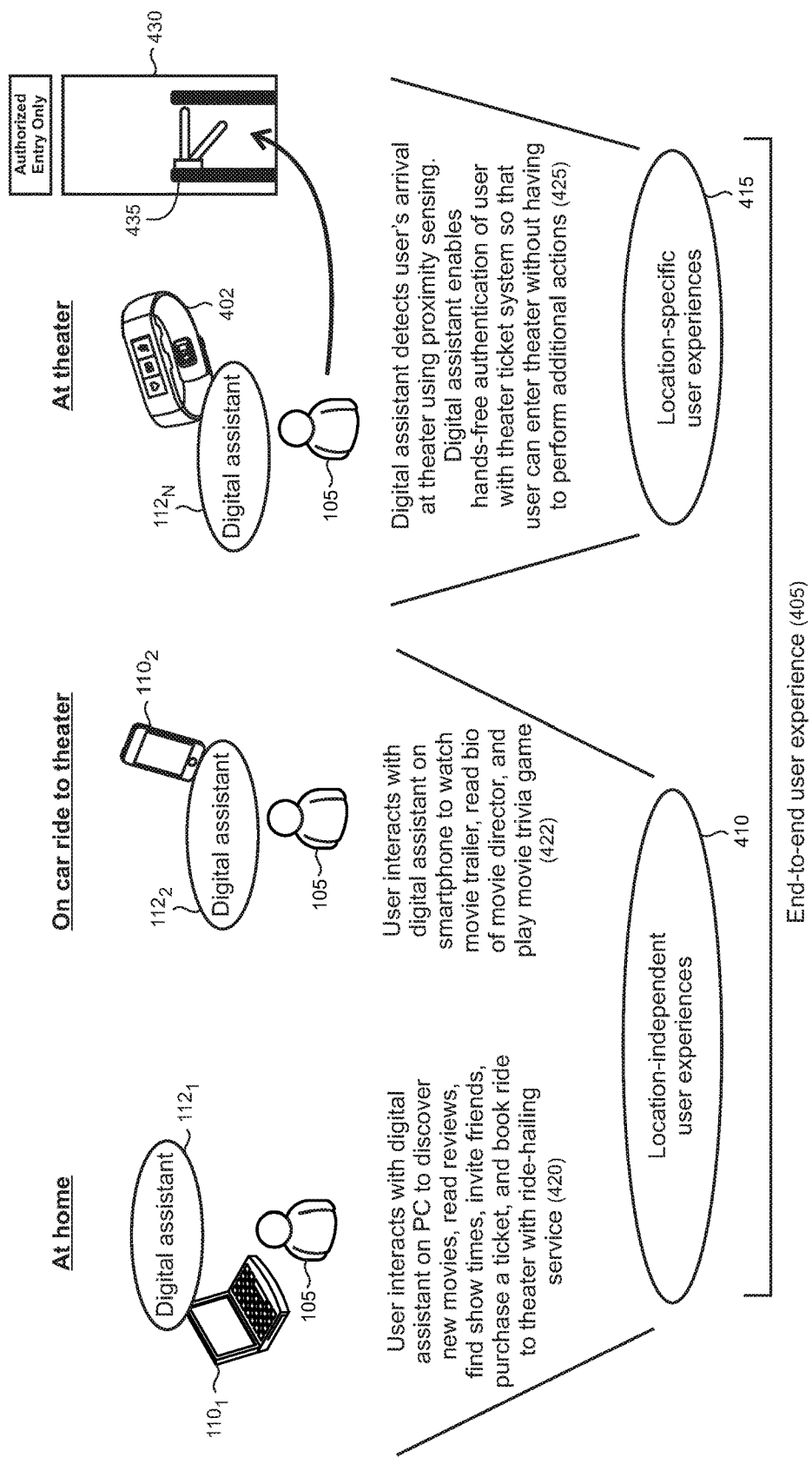
FIG. 4 shows an illustrative example of an end-to-end user experience involving a trip to the movies.

FIG. 4 shows an illustrative example of an end-to-end user experience 405 involving a trip to the movies. In this particular example, the user 105 employs an instance of a digital assistant 112 on a device 110 such as a laptop PC at home to engage in various location-independent user experiences 410. In other examples, the user may participate in the user experiences 410 in various locations other than home. The experiences 410 illustratively include interacting with the digital assistant for discovering new movies, reading reviews, finding show times, inviting friends, purchasing a ticket, and booking a ride to the theater through a ride-hailing service, as indicated by reference numeral 420. The digital assistant 112 on the laptop PC 110 can interact with applications and services, typically behind the scene in a manner that is transparent to the user, to comprehensively add to the user experience. The digital assistant's extensibility to the applications and services enables their services and content to be rendered as a native digital assistant user experience which may further enhance the seamlessness of its services to the user.

Later, while traveling to the movie theater by car, another instance of a digital assistant 112 instantiated on the user's smartphone device 110 enables the user to engage in additional user experiences. Using the sensors in the device 110, the digital assistant 112 can determine that the user is in the car. The digital assistant also has contextual knowledge of the user's movie plans. Thus, for example, the digital assistant can gather and curate user experiences that relate to the movie with which the user can engage during the length of the car ride to the theater. As indicated by reference numeral 422, these user experiences may include watching a trailer for the movie on the device 110, reading a biography of the movie director, and playing a trivia game dealing with action movies.

Another instance of a digital assistant 112 instantiated on the user's wearable computing device 402 such as an HMD device, accessory device, or smartwatch, leverages proximity sensing to detect the user's arrival at the movie theater. The proximity sensing enables the digital assistant 112 to support location-specific user experiences 415 which, in this example, include hands-free authentication, as indicated by reference numeral 425. The digital assistant 112 interacts with the theater's ticketing system and/or other applications and services to authenticate the user as a ticket holder. By being authenticated, the user is provided access to the theater at an entrance 430 without having to take actions herself upon arrival. In this particular example, the entrance 430 includes an entry control device 435 such as a turnstile, gate, or door that operates, upon completion of authentication, to give the user access to an area that is restricted to only ticket holders.

Figure 5:
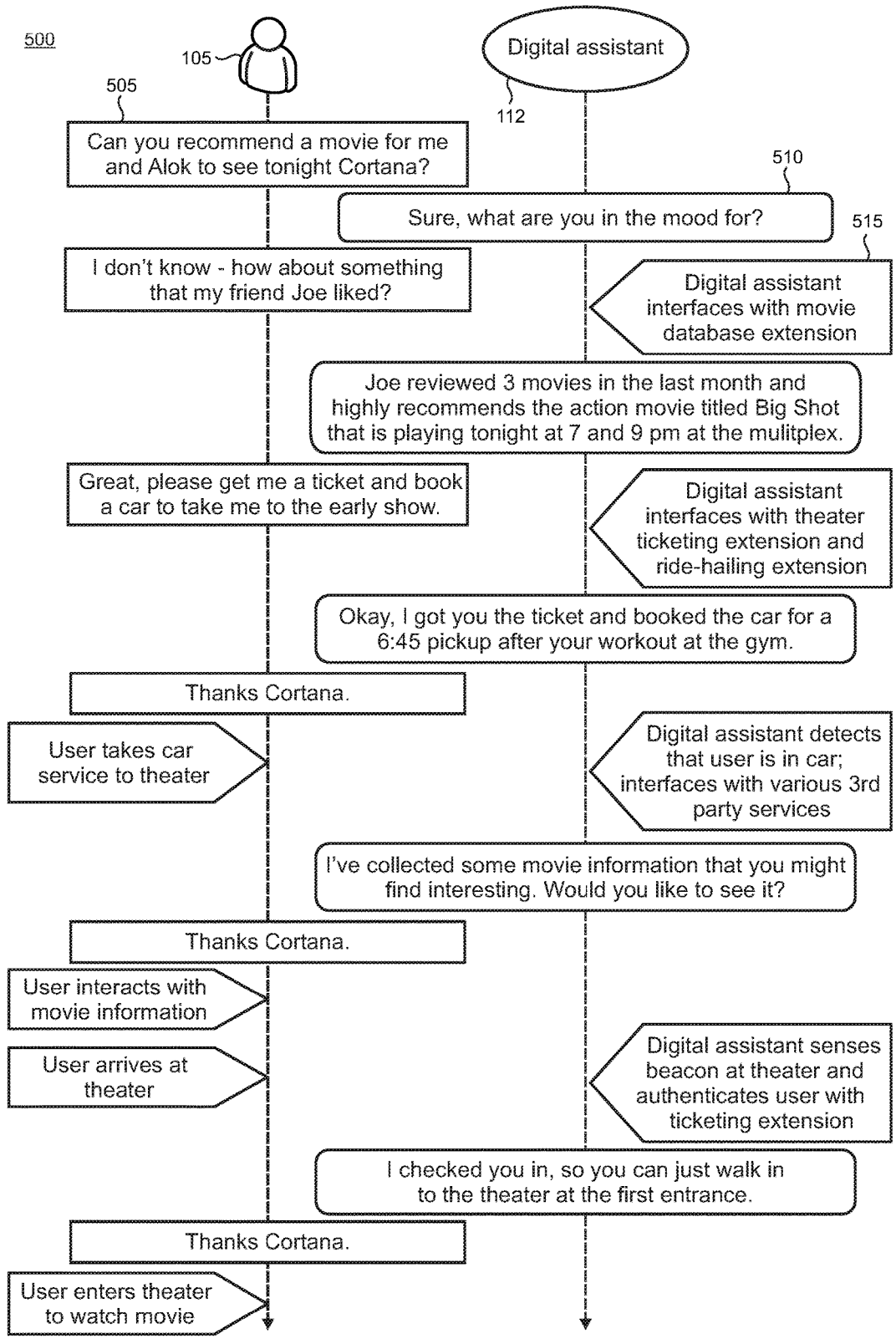
FIG. 5 shows a transcript of an illustrative end-to-end user experience with a digital assistant.

FIG. 5 shows a transcript 500 of the illustrative movie trip user experience with a digital assistant described above with regard to FIG. 4. As shown in FIG. 5, the user 105 has voice-based interactions with a digital assistant 112 (named "Cortana" in this illustrative example) that is operating on device 110. The user's dialog is shown on the left-hand side of the drawing using rectangles (representatively indicated by reference numeral 505). The digital assistant's dialog is shown on the right-hand side using rounded rectangles (representatively indicated by reference numeral 510). Actions are shown using flags (representatively indicated by reference numeral 515). By interacting with the user 105 using voice, the digital assistant 112 is able to ascertain the user's intents and take responsive actions. As indicated in the transcript 500, the digital assistant 112 participates in the movie user experience from its start, when the user first asks for assistance with movie discovery, to its conclusion, when the user enters the theater as an authenticated ticket holder.

Figure 6:
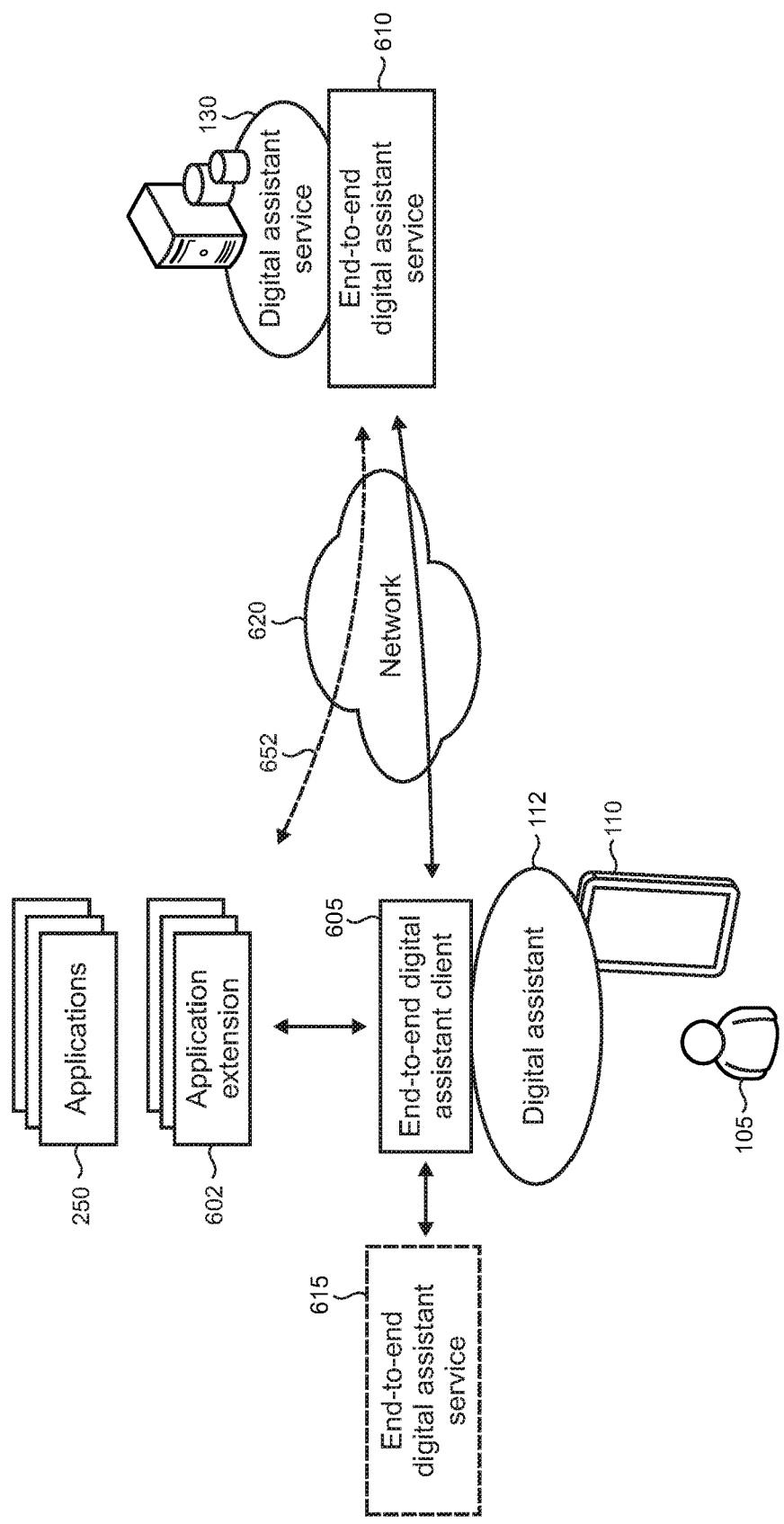
FIG. 6 shows an illustrative digital assistant that includes an end-to-end digital assistant client configured to interface with applications and extensions and a local or remote end-to-end digital assistant service.

Various illustrative implementation details are now described. FIG. 6 shows an illustrative digital assistant 112 that includes an end-to-end digital assistant client 605 configured to interface with applications 250 and extensions 602 and a remote end-to-end digital assistant service 610 that is exposed by the digital assistant service 130 that is accessed over a network 620 (e.g., network 115 and/or Internet 120 in FIG. 1). A user 105 employs a device 110 that hosts a digital assistant 112. An end-to-end digital assistant service can be partly or fully instantiated as a local service 615 as an optional alternative in some implementations. The end-to-end digital assistant client 605 is configured to enable interaction with application extensions 602 so that various aspects of an application's user experiences, features, and content can be integrated with the digital assistant 112. Typically the extensibility is implemented so that applications can render user experiences, features, and content using the digital assistant with a similar and consistent sound, look, and feel in most cases so that transitions between the applications and the digital assistant are handled smoothly and the experiences are rendered seamlessly to the user.

The extensions 602 can be associated with third party applications in some cases in which the application authors, developers, or providers are entities that are not the same as the provider of the digital assistant 112, operating system, or other components that may be executing on a given device. First party and second party applications can also be supported in some implementations. In some cases, the end-to-end digital assistant service 610 may support direct interaction with the applications 250, as indicated by line 652.

Figure 7:
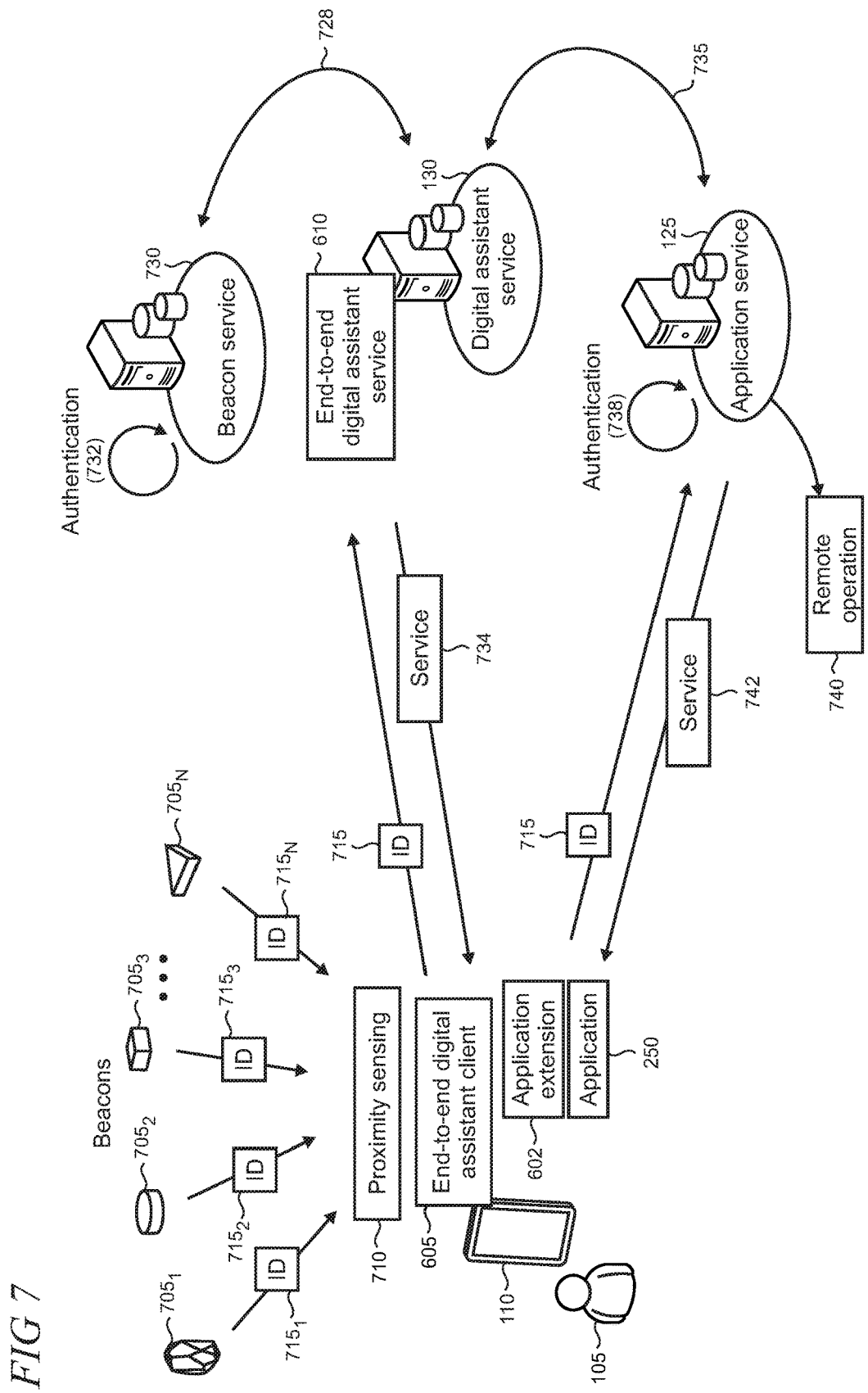
FIG. 7 shows illustrative wireless beacons that interact with a mobile device to enable proximity sensing.

FIG. 7 shows illustrative wireless beacons 705 that interact with a mobile device 110 to enable a proximity sensing functionality, as indicated by reference numeral 710, which may be implemented using the device's operating system, an application, or other suitable component. In some implementations, one or more of the wireless beacons 705 may be implemented as Bluetooth® low energy (BLE) beacons, although other suitable wireless communication technologies supporting proximity sensing may also be utilized. Current protocols include, for example, iBeacon, AltBeacon, Eddystone, and other protocols are anticipated to be developed as beacons become more widely deployed. The beacons 705 may also be compliant with the Near Field Communication (NFC) technologies in some implementations. Beacons can be powered by internal batteries, powered by AC sources, and/or powered by external DC sources including USB (Universal Serial Bus) and power systems in vehicles such as automobiles, planes, trains, etc. Various alternatives to the wireless beacons may also be utilized in some implementations, including Wi-Fi (under IEEE 802.11), infrared, Global Navigation Satellite System (GNSS), and other suitable wireless transmission technologies that can wirelessly broadcast a UUID.

The beacons 705 can employ different form factors and be positioned at a variety of locations, both indoors and outdoors. A beacon can be located near, or be associated with, a particular feature, location, or point of interest in some situations (e.g., a bus stop, a taxi cab interior, a point of sale terminal at an airport, an exhibit at a museum, an entry door at a building, and the like). Each beacon 705 is configured to intermittently or continuously transmit an ID, as identified by reference numeral 715, such as a universally unique identifier (UUID). The transmission is a unilateral broadcast from the beacon to the device, and beacons are not typically configured to receive communications. The ID can include, for example, a field of 16 bits for some BLE services or 128 bits for custom services. As the ID 715 is typically transmitted using low power, the device 110 can detect the transmitted ID when it is in relatively close proximity to the beacon 705. Some beacons may be configured to enable proximity sensing so that the device can estimate distance to the beacon within a range of a few meters. Other beacons may further enable proximity sensing within a range of a few centimeters. The maximum range can vary by beacon configuration and application-specific and environmental factors, among other factors.

Unlike GNSS technologies that may be used to determine the geographic location coordinates of a GNSS receiver in a device using triangulation of satellite signals, beacons only provide a self-identification signal. The proximity sensing 710 enables the digital assistant 112 to determine whether the device 110 is near a specific beacon 705. That is, the digital assistant uses the ID 715 to determine its location relative to the beacon but does not determine its location in an absolute manner (i.e., relative to a global coordinate system using latitude and longitude as with GNSS). Thus, in the movie scenario shown in FIG. 4 and described in the accompanying text, a beacon 705 can be positioned at the entry control device 435 to enable authenticated entry of the user.

When the device 110 is within some threshold proximity to a given beacon 705, it can receive the beacon's ID 715. The end-to-end digital assistant client 605 may send the ID 715 over a suitable network (not shown) to the end-to-end digital assistant service 610. As indicated by line 728, the end-to-end digital assistant service 610 can interoperate with a beacon service 730 that may be configured to provide beacon-specific services including, for example, the provision of data associated with the beacon that may not be included within the ID bit field, and/or other services. The beacon service 730 may also perform authentication 732 in some cases. In an alternative implementation, the digital assistant service may perform authentication on its own without relying on external services. In another alternative implementation, the end-to-end digital assistant client 605 may send the ID 715 directly to the remote beacon service 730 using, for example, an application 250 and application extension 602.

As indicated by line 735, the end-to-end digital assistant service 610 may interoperate with an application service 125 that may be configured to provide authentication 738 and/or other services. Continuing with the movie scenario, the application service 125 may be a ticketing and authentication system used by the theater. The end-to-end digital assistant service 610 can send the ID 715 to the theater ticketing and authentication system along with verification that the user is a ticket holder, for example by providing a code that was received upon ticket purchase or other proof. In some cases, the interaction between the end-to-end digital assistant service and the theater ticketing and authentication system can incorporate security negotiations such as challenge-response authentication or other suitable techniques.

The application service 125 can perform authentication and provide notification as to success or failure to the end-to-end digital assistant service 610. The application service 125 can also provide additional services and information to the end-to-end digital assistant service 610 in some implementations. For example, in the case of an authentication success, the application service 125 can send a ticket receipt, offers and coupons for other movies, merchandise and concessions, advertising, confirmation of frequent movie goer points, and the like. The application service 125 can also engage in remote operations, as indicated by reference numeral 740, such as unlocking a door, gate, or turnstile, operating a signaling device, providing an authentication success notification to a remote system or device, and the like. In the case of an authentication failure, for example, the application service 125 may indicate that the user is attempting entry at the wrong entrance or has a ticket to a later showing.

In response to the received ID 715, the end-to-end digital assistant service 610 can provide a service 734 to the client 605 which can facilitate a particular end-to-end user experience. For example, the service 734 can include a success notification that the authentication is complete which the digital assistant on the device can relay to the user by voice, text, or graphics. The service 734 may also include additional services and information in some cases, as described above. Alternatively, if authentication fails, the service 734 may include a failure notification and/or additional information that the end-to-end digital assistant client 605 may utilize to assist the user to reattempt authentication with success. For example, the digital assistant may guide the user to the correct entry.

In some implementations the end-to-end digital assistant client 605 may interact directly with an application 250 through its extension 602 to enable authentication, as shown in FIG. 7. For example, the application 250 may be a movie ticketing and authentication application that interacts with the remote application service 125. The application 250 can pass the ID 715 to the service 125 which can provide a service 742 in response, in a similar manner to that provided by the end-to-end digital assistant service, as described above.

Figure 8:
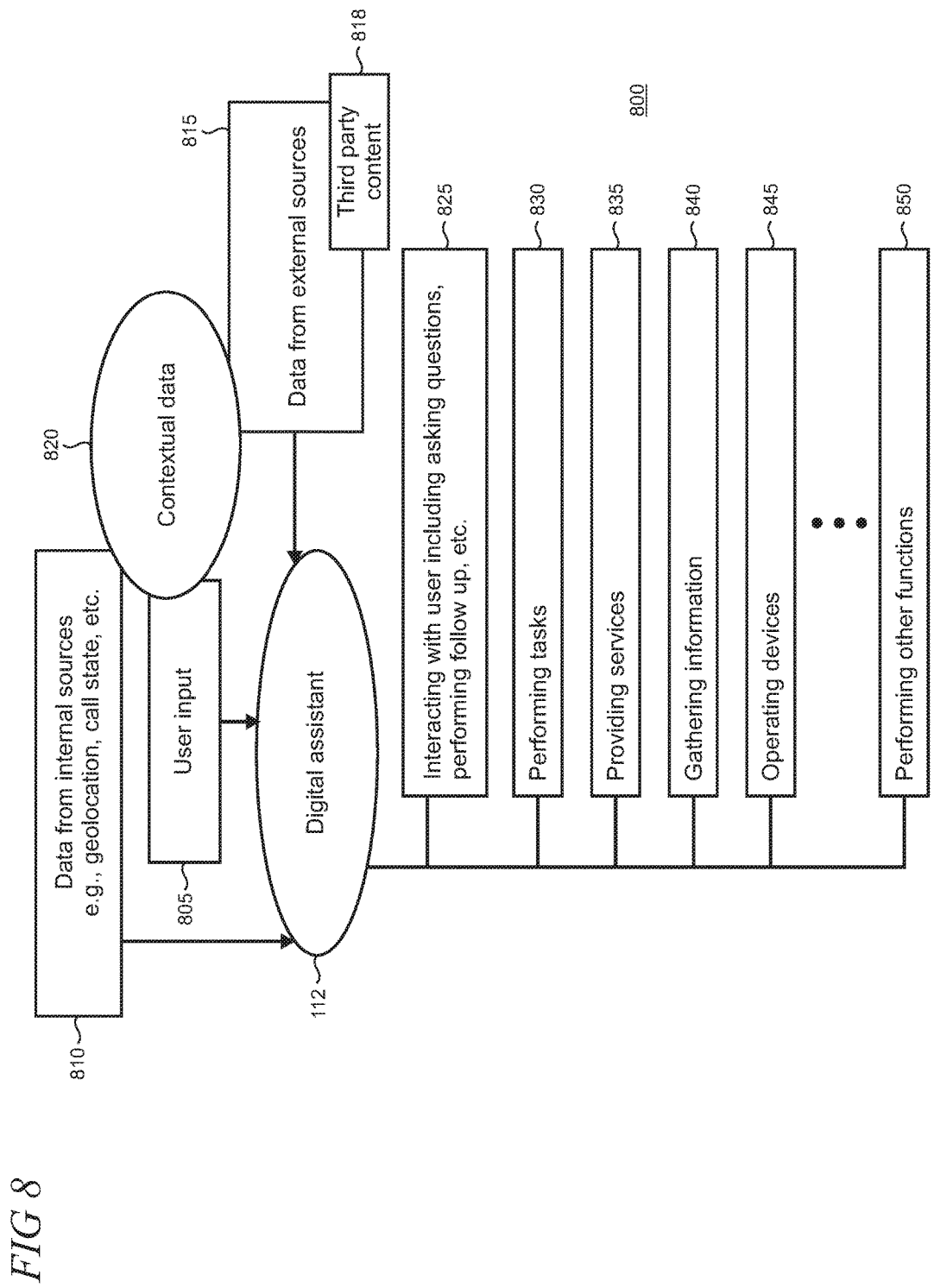
FIG. 8 shows illustrative inputs to a digital assistant and an illustrative taxonomy of general functions that may be performed by a digital assistant.

FIG. 8 shows an illustrative taxonomy of functions 800 that may typically be supported by the digital assistant 112 either natively or in combination with an application 250 (FIG. 2). Inputs to the digital assistant 112 typically can include user input 805, data from internal sources 810, and data from external sources 815 which can include third-party content 818. For example, data from internal sources 810 could include the current location of the device 110 that is reported by a GPS (Global Positioning System) component on the device, or some other location-aware component. The externally sourced data 815 includes data provided, for example, by external systems, databases, services, and the like.

The various inputs can be used alone or in various combinations to enable the digital assistant 112 to utilize contextual data 820 when it operates. Contextual data can include, for example, time/date, the user's location, language, schedule, applications installed on the device, the user's preferences, the user's behaviors (in which such behaviors may be monitored/tracked with notice to the user and the user's consent), stored contacts (including, in some cases, links to a local user's or remote user's social graph such as those maintained by external social networking services), call history, messaging history, browsing history, device type, device capabilities, communication network type and/or features/functionalities provided therein, mobile data plan restrictions/limitations, data associated with other parties to a communication (e.g., their schedules, preferences, etc.), and the like.

As shown, the functions 800 illustratively include interacting with the user 825 (through a natural language user interface and other graphical interfaces, for example); performing tasks 830 (e.g., making note of appointments in the user's calendar, sending messages and emails, etc.); providing services 835 (e.g., answering questions from the user, mapping directions to a destination, setting alarms, forwarding notifications, reading emails, news, blogs, etc.); gathering information 840 (e.g., finding information requested by the user about a book or movie, locating the nearest Italian restaurant, etc.); operating devices 845 (e.g., setting preferences, adjusting screen brightness, turning wireless connections such as Wi-Fi and Bluetooth on and off, communicating with other devices, controlling smart appliances, etc.); and performing various other functions 850. The list of functions 800 is not intended to be exhaustive and other functions may be provided by the digital assistant 112 and/or applications 250 as may be needed for a particular implementation of the present end-to-end user experiences with a digital assistant.

Figure 9:
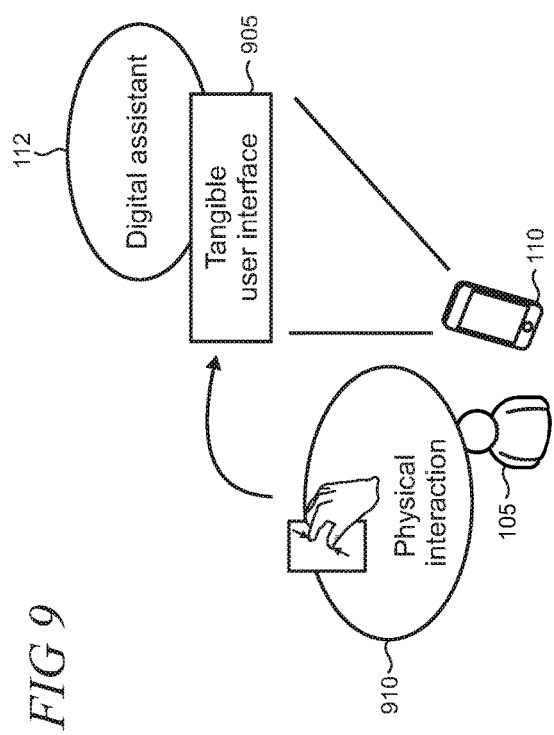

A user can typically interact with the digital assistant 112 in a number of ways depending on the features and functionalities supported by a given device 110. For example, as shown in FIG. 9, the digital assistant 112 may expose a tangible user interface 905 that enables the user 105 to employ physical interactions 910 in support of user experiences on the device 110. Such physical interactions can include manipulation of physical and/or virtual controls such as buttons, menus, keyboards, etc., using touch-based inputs like tapping, flicking, dragging, etc. on a touchscreen, and the like.

Figure 10:
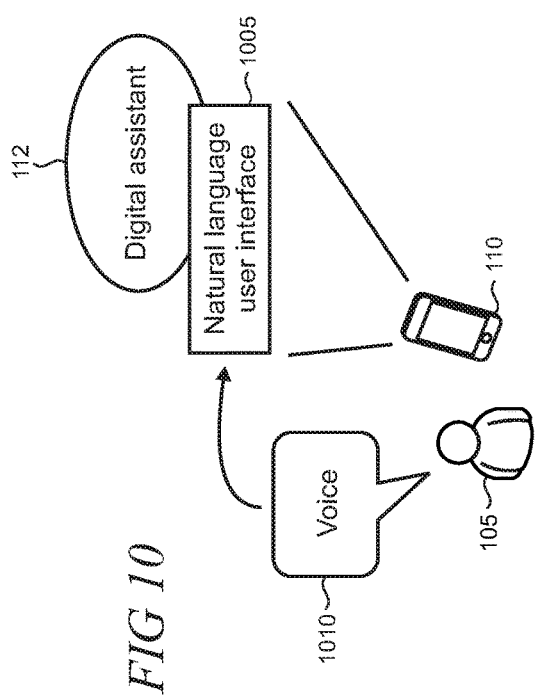

In some implementations, the digital assistant 112 may expose a natural language user interface 1005 shown in FIG. 10, or alternatively a voice command-based user interface (not shown), with which the user employs voice 1010 to provide various inputs to the device 110.

Figure 11:
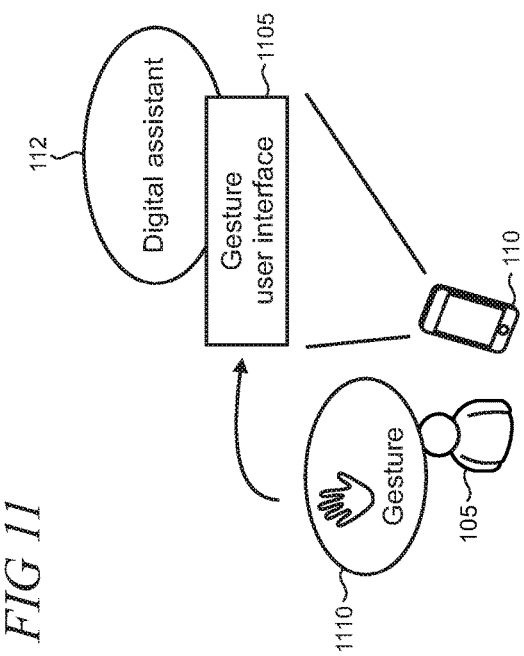
FIGS. 9, 10, and 11 show illustrative interfaces between a user and a digital assistant.

In other implementations, the digital assistant 112 may expose a gesture user interface 1105 shown in FIG. 11 with which the user 105 employs gestures 1110 to provide inputs to the device 110. It is noted that in some cases, combinations of user interfaces may be utilized where the user may employ, for example, both voice and physical inputs to interact with the digital assistant 112 and the device 110. The user gestures can be sensed using various techniques such as optical sensing, touch sensing, proximity sensing, and the like.

Figure 12:
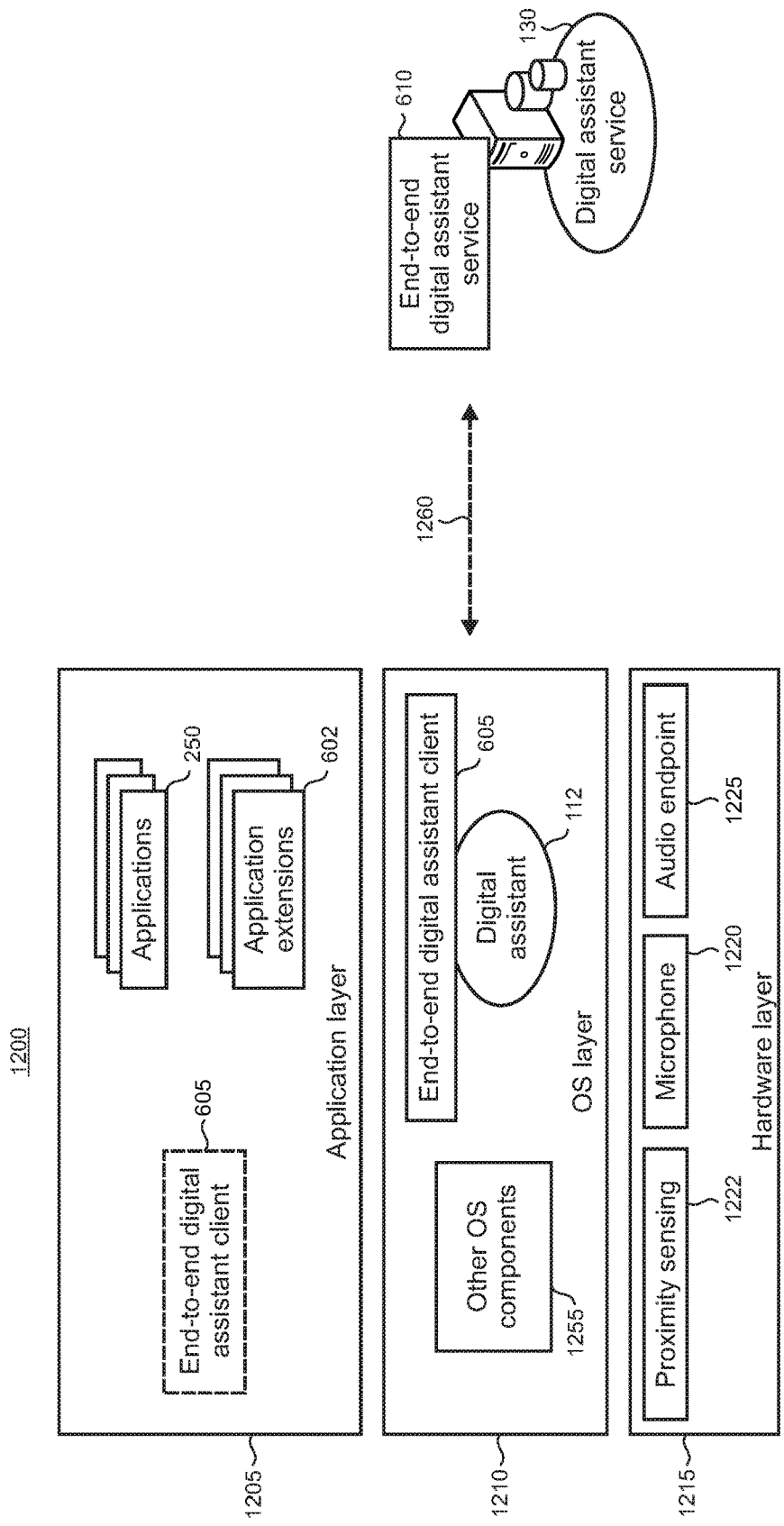
FIG. 12 shows an illustrative layered architecture that includes a digital assistant, end-to-end digital assistant client, application extensions, and applications.

FIG. 12 shows an illustrative layered architecture 1200 that may be instantiated on a given device 110. The architecture 1200 is typically implemented in software, although combinations of software, firmware, and/or hardware may also be utilized in some cases. The architecture 1200 is arranged in layers and includes an application layer 1205, an OS (operating system) layer 1210, and a hardware layer 1215. The hardware layer 1215 provides an abstraction of the various hardware used by the device 110 (e.g., input and output devices, networking and radio hardware, etc.) to the layers above it. In this illustrative example, the hardware layer supports proximity sensing hardware 1222, a microphone 1220, and an audio endpoint 1225 which may include, for example, the device's internal speaker, a wired or wireless headset/earpiece, external speaker/device, and the like.

The application layer 1205 in this illustrative example supports various applications 250 (e.g., web browser, map application, email application, news application, etc.). The applications are often implemented using locally executing code. However in some cases, these applications can rely on services and/or remote code execution provided by remote servers or other computing platforms such as those supported by a service provider or other cloud-based resources. While the end-to-end digital assistant client 605 is shown here as a component that is instantiated in the application layer 1205, it will be appreciated that the functionality provided by a given application may be implemented, in whole or part, using components that are supported in either the OS or hardware layers.

The OS layer 1210 supports the digital assistant 112 and the end-to-end digital assistant client 605 and various other OS components 1255. In alternative implementations, the end-to-end digital assistant client 605 can be optionally instantiated as a standalone application in the application layer 1205, as shown by the dashed rectangle. In typical implementations, the digital assistant 112 can interact with the digital assistant service 130 and/or end-to-end digital assistant service 610, as indicated by line 1260. That is, the digital assistant 112 in some implementations can partially utilize or fully utilize remote code execution supported at the service 130, or using other remote resources. In addition, it may utilize and/or interact with the other OS components 1255 (and/or other components that are instantiated in the other layers of the architecture 1200) as may be needed to implement the various features and functions described herein. In some implementations, some or all of the functionalities supported by the end-to-end digital assistant client 605 can be incorporated into the digital assistant 112 and the particular division of functionality between the services can be selected as a matter of design choice. As noted above, the digital assistant 112 can also interact with end-to-end user experience services that are partially or fully instantiated locally on the device 110. For example, the services can apply local resources and implement local logic in order to support a variety of user experiences and features.

Figure 13:
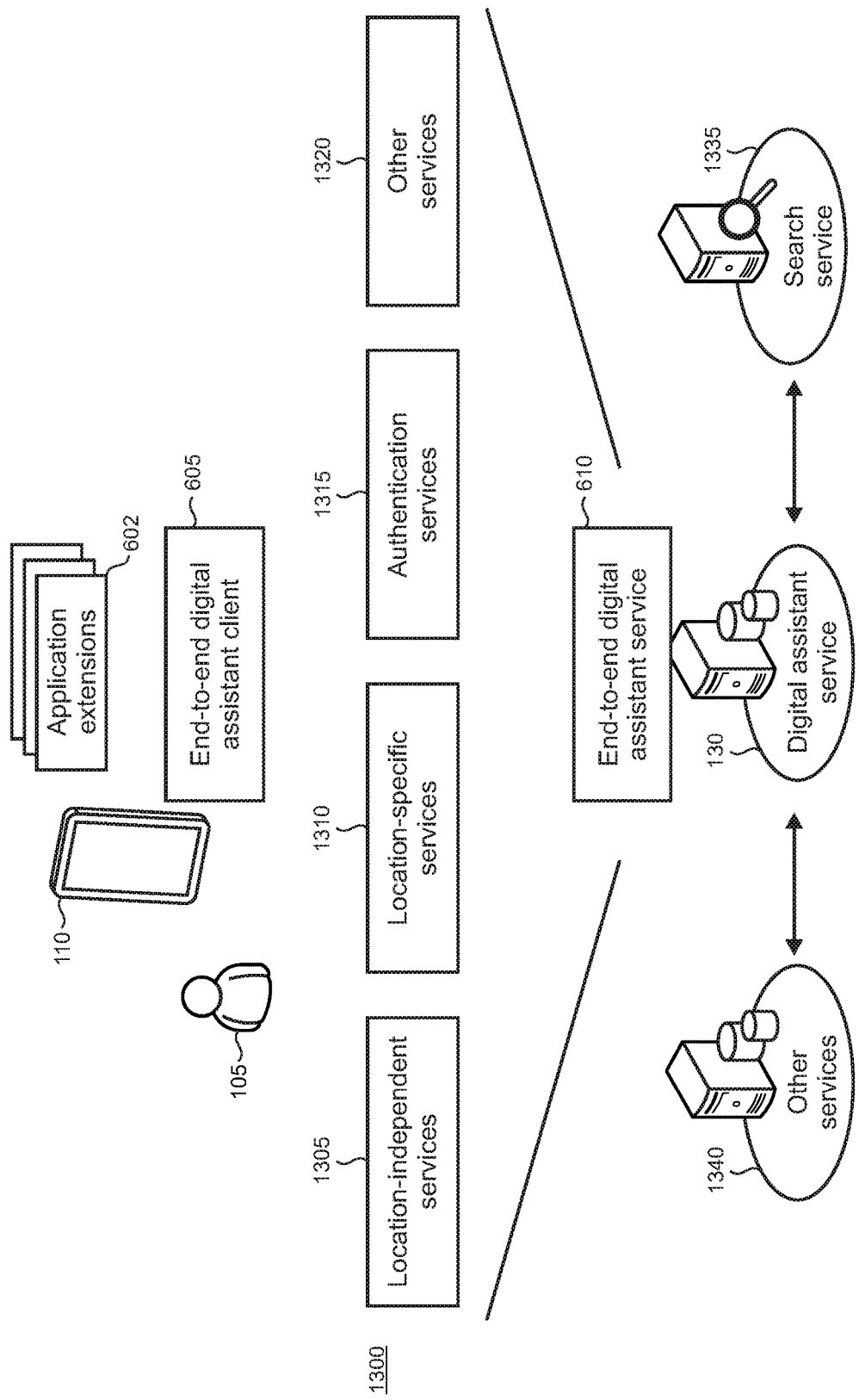
FIG. 13 shows illustrative services exposed by an end-to-end digital assistant.

FIG. 13 shows illustrative end-to-end user experience services 1300 that may be exposed by the remote end-to-end digital assistant service 610 and local digital assistant client 605 to the application extensions 602. The services 1300 can also be implemented and/or rendered locally on the device 110 in whole or part by the end-to-end digital assistant client 605 and/or the local end-to-end digital assistant service 615 (FIG. 6). Alternatively, some or all of the services 1300 may be directly provided to the extensions 602 from the end-to-end digital assistant service 610 in some cases using interfaces (not shown) that enable remote access. The digital assistant service 130 and/or end-to-end digital assistant service 610 may access other services from a variety of providers, such as search services 1335, and other services 1340, as may be needed to support the provisioning of the services 1300.

The service 1300 may include location-independent services 1305 and location-specific services 1310, as described above. The authentication services 1315 can enable application extensions 602 to leverage the capabilities of the digital assistant during authentication. Other services 1320 can also be exposed by the end-to-end digital assistant service 610 to meet the needs of a particular implementation.

Figure 14:
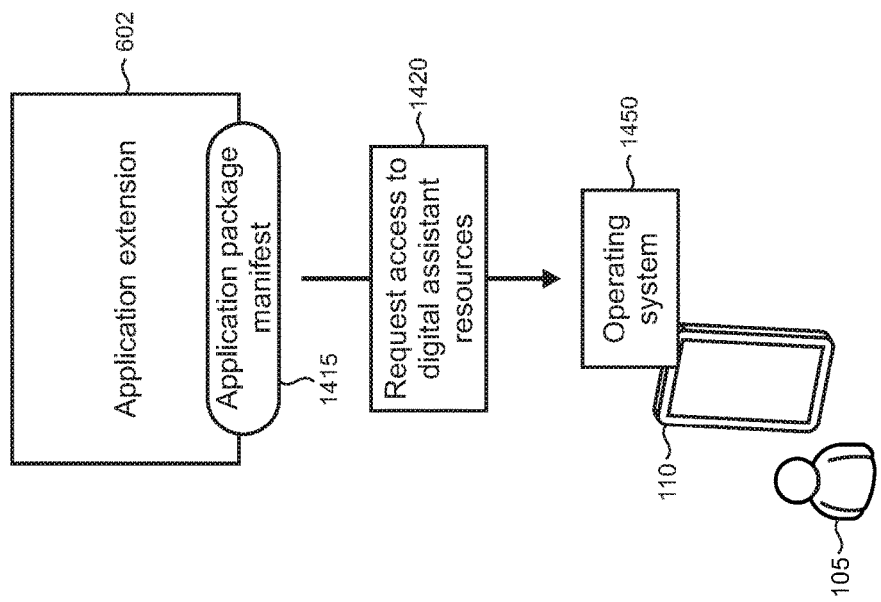
FIG. 14 shows illustrative interactions between an application extension and an operating system on a device during application installation.

As shown in FIG. 14, during installation of an application extension 602 on a device 110, an application package manifest 1415, or similar installation package that is utilized to validate and deploy the application, is configured to launch a request 1420 to access digital assistant resources. Typically, the request describes the extensibility points of interaction for the application, a description of capabilities and resources required, and the like to facilitate interaction between the application and the operating system 1450 and/or digital assistant components executing thereon.

Figure 15:
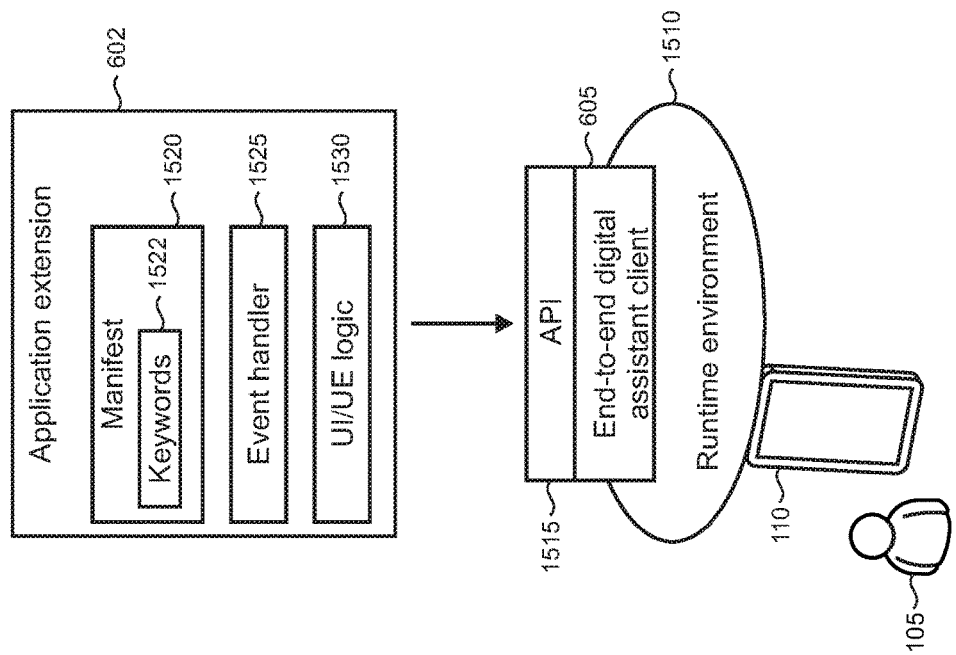
FIG. 15 shows illustrative interactions between an application extension and an end-to-end digital assistant client during application runtime.

As shown in FIG. 15, during application extension operation at runtime on a device 110 in a runtime environment 1510, an application extension 602 can interface with the end-to-end digital assistant client 605 through an application programming interface (API) 1515 and load a manifest 1520 that can include application-specific resources such as graphics, audio, commands, and other information. For example, the manifest 1520 can include keywords 1522 that can be loaded from the manifest and registered with the end-to-end digital assistant client. The registered keywords may be invoked by the user at runtime and input events can be directed to the appropriate application extension. Application names are typical examples of keywords so that a user can direct the digital assistant to launch an application by name or obtain information, services, content, and the like from a named application. During runtime, the end-to-end digital assistant client 605 can pass events associated with user inputs, actions, and behaviors to an event handler 1525 in the application extension. The application extension 602 can apply logic 1530 such as scripts and other programming constructs in order to facilitate a particular user experience or user interface through the digital assistant.

Figure 16:
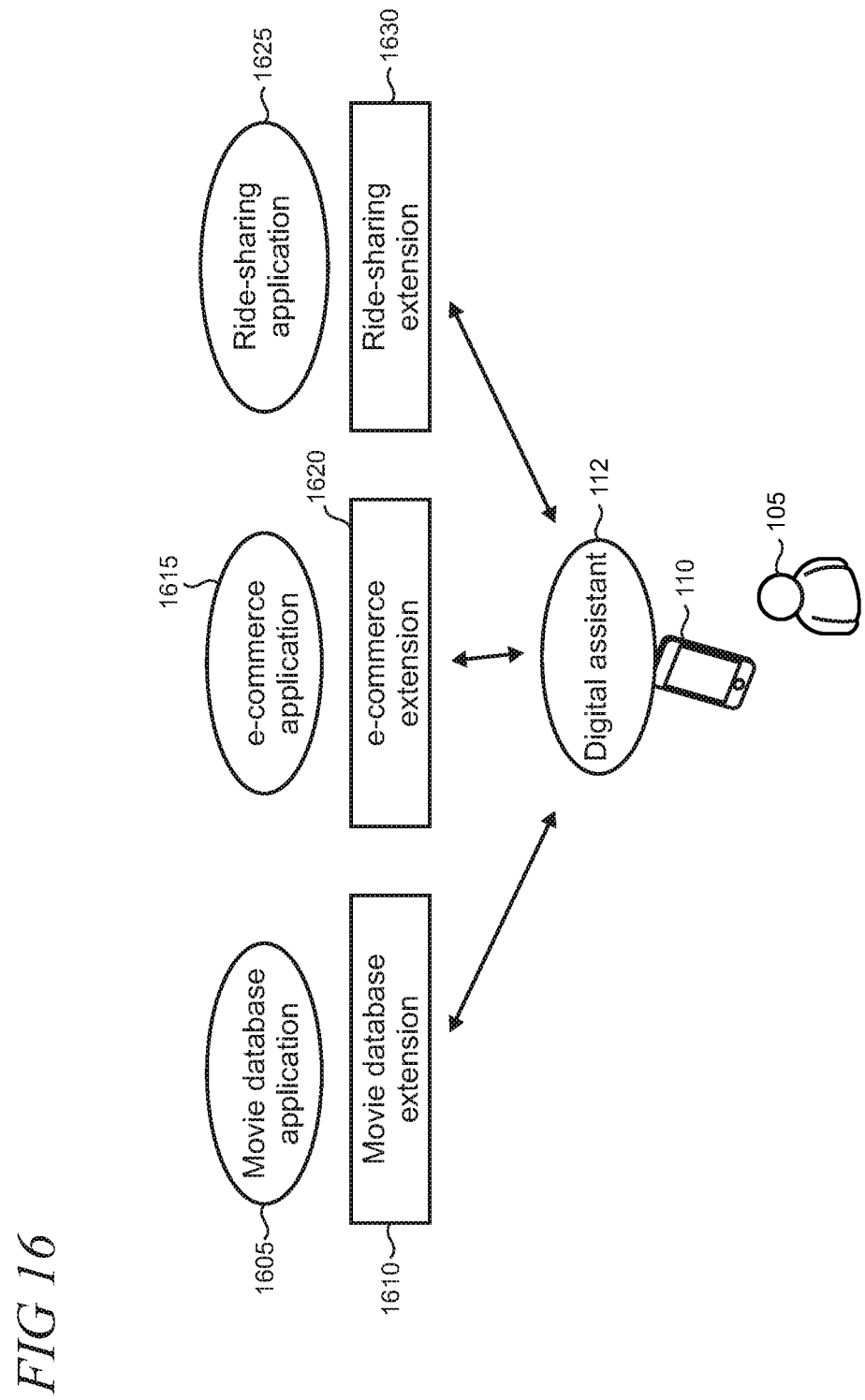
FIG. 16 shows three illustrative application extensions that are installed on a device.

FIG. 16 shows three illustrative applications and corresponding extensions that are installed on a device 110 and which may interact with the digital assistant as described above. The applications include a movie database application 1605 and extension 1610, an e-commerce application 1615 and extension 1620, and a ride-sharing application 1625 and extension 1630. It is emphasized that the applications and extensions are intended to be illustrative and that any of a variety of applications and extensions may be utilized in a given scenario.

Figure 17:
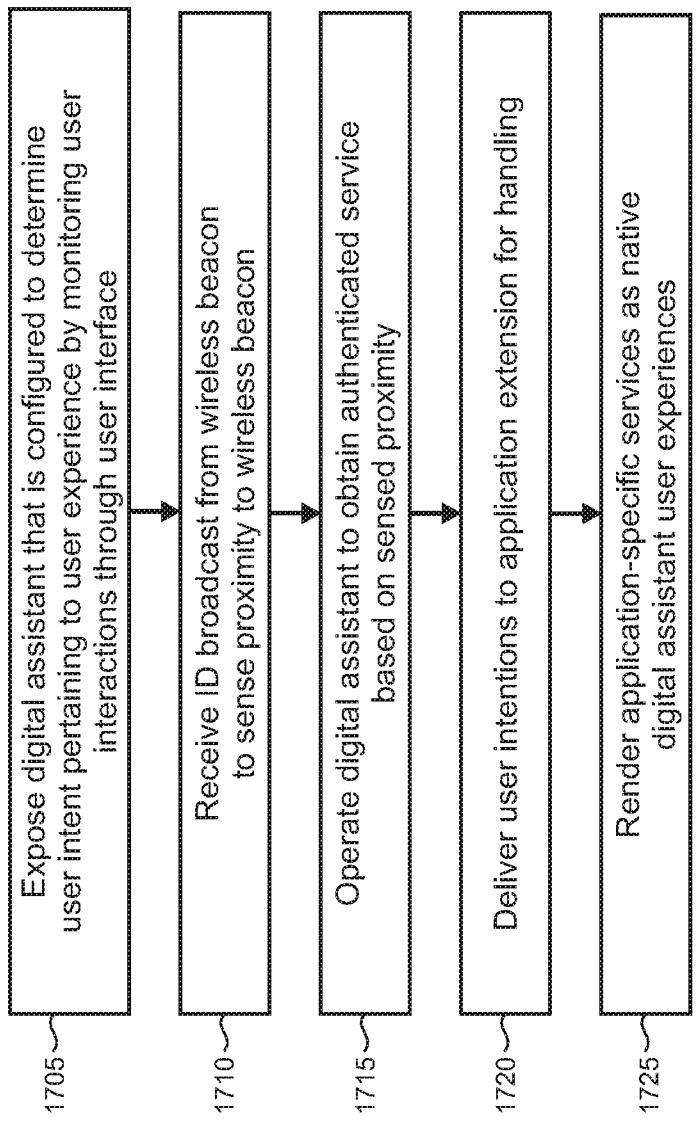
FIGS. 17, 18, and 19 show illustrative methods that may be performed when implementing the present end-to-end user experiences with a digital assistant.

FIG. 17 shows a flowchart of an illustrative method 1700 that may be performed on a device (e.g., device 110 in FIG. 1). Unless specifically stated, the methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1705, a digital assistant is exposed on the device. The digital assistant is configured to determine user intent pertaining to a user experience by monitoring user interactions at a user interface exposed by the device. In step 1710, an ID broadcast by a wireless beacon 705 (FIG. 7) is received at the device to enable the device to sense proximity to the wireless beacon.

In step 1715, the digital assistant is operated to obtain an authenticated service based on the sensed proximity. For example, the beacon ID may be sent to a remote service (e.g., application service 125 in FIG. 1) so that the device or the device user can be authenticated for access to restricted resources or locations. In step 1720, the user intentions determined from the interactions at the user interface may be delivered via an extension to an application for handling. In step 1725, the application-specific services received from an application extension may be rendered on the user interface as a native digital assistant user experience.

Figure 18:
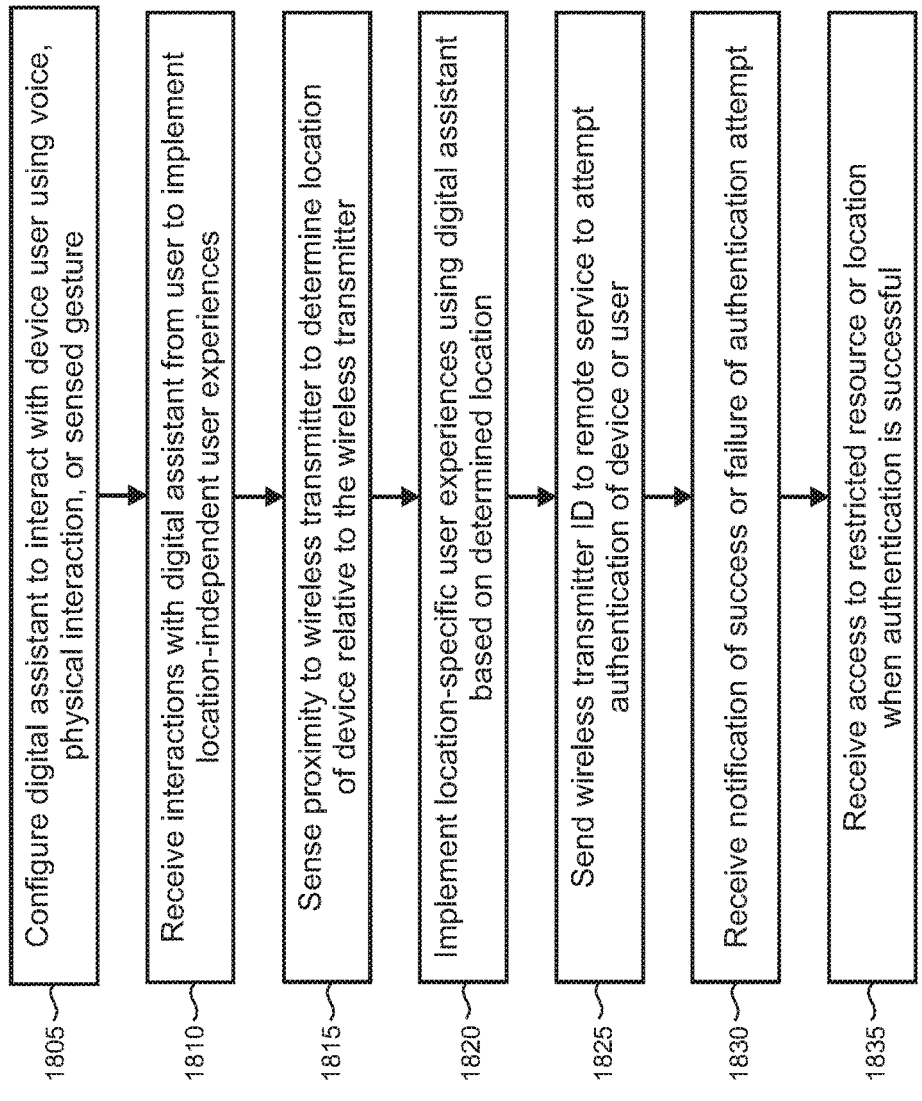

FIG. 18 is a flowchart of an illustrative method 1800 that may be implemented on a device (e.g., device 110 in FIG. 1). In step 1805, a digital assistant operating on the device is configured to interact with a device user using voice, physical interaction, or sensed gesture. In step 1810, interactions with the digital assistant from the user are received in order to implement location-independent user experiences. In step 1815, proximity to a wireless transmitter (e.g., beacon 705 in FIG. 7, a GNSS device, infrared device, NFC device, Wi-Fi device, or other suitable device) is sensed to determine a location of the device relative to the wireless beacon.

In step 1820, the digital assistant can implement location-specific user experiences based on the determined location. In step 1825, the received transmitter ID may be sent to a remote service (e.g., application service 125 in FIG. 1) so that authentication of the device or device user may be attempted. In step 1830, a notification sent from the remote service as to the success or failure of the authentication attempt is received. In step 1835, access to a restricted resource or location is received when the authentication is successful.

Figure 19:
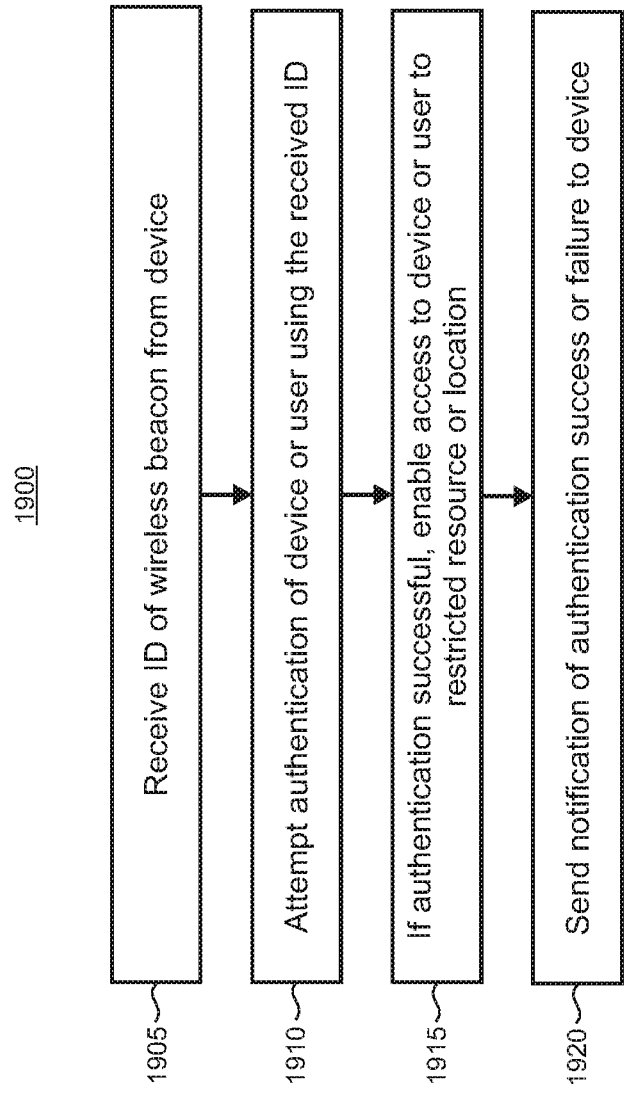

FIG. 19 shows an illustrative method 1900 that may be utilized by a service provider (e.g., application service 125 in FIG. 1). In step 1905, an ID associated with a wireless beacon is received from a device (e.g., device 110 in FIG. 1). In step 1910, authentication of the device or a device user is attempted using the received ID. In step 1915, if the authentication is successful, then the service provider enables access to the authenticated device or user to a restricted resource or location. In step 1920, a notification of authentication success or failure is sent to the device.

Figure 20:
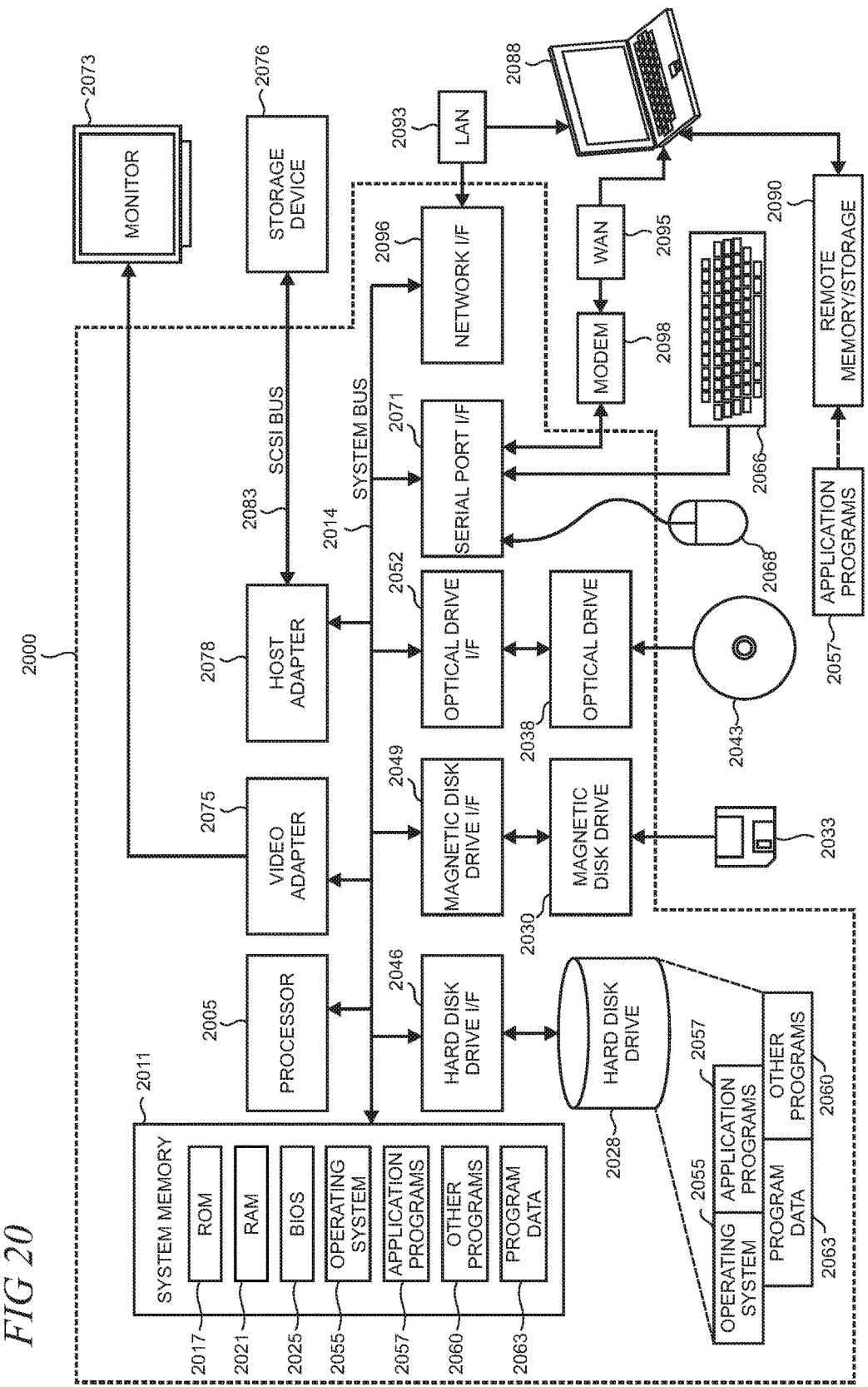
FIG. 20 is a simplified block diagram of an illustrative computer system such as a personal computer (PC) that may be used in part to implement the present end-to-end user experiences with a digital assistant.

FIG. 20 is a simplified block diagram of an illustrative computer system 2000 such as a PC, client machine, or server with which the present end-to-end experiences with a digital assistant may be implemented. Computer system 2000 includes a processor 2005, a system memory 2011, and a system bus 2014 that couples various system components including the system memory 2011 to the processor 2005. The system bus 2014 may be any of several types of bus structures including a memory bus or memory controller, a peripheral bus, or a local bus using any of a variety of bus architectures. The system memory 2011 includes read only memory (ROM) 2017 and random access memory (RAM) 2021. A basic input/output system (BIOS) 2025, containing the basic routines that help to transfer information between elements within the computer system 2000, such as during startup, is stored in ROM 2017. The computer system 2000 may further include a hard disk drive 2028 for reading from and writing to an internally disposed hard disk (not shown), a magnetic disk drive 2030 for reading from or writing to a removable magnetic disk 2033 (e.g., a floppy disk), and an optical disk drive 2038 for reading from or writing to a removable optical disk 2043 such as a CD (compact disc), DVD (digital versatile disc), or other optical media. The hard disk drive 2028, magnetic disk drive 2030, and optical disk drive 2038 are connected to the system bus 2014 by a hard disk drive interface 2046, a magnetic disk drive interface 2049, and an optical drive interface 2052, respectively. The drives and their associated computer-readable storage media provide non-volatile storage of computer-readable instructions, data structures, program modules, and other data for the computer system 2000. Although this illustrative example includes a hard disk, a removable magnetic disk 2033, and a removable optical disk 2043, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present end-to-end users experiences with a digital assistant. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk, magnetic disk 2033, optical disk 2043, ROM 2017, or RAM 2021, including an operating system 2055, one or more application programs 2057, other program modules 2060, and program data 2063. A user may enter commands and information into the computer system 2000 through input devices such as a keyboard 2066 and pointing device 2068 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 2005 through a serial port interface 2071 that is coupled to the system bus 2014, but may be connected by other interfaces, such as a parallel port, game port, or universal serial bus (USB). A monitor 2073 or other type of display device is also connected to the system bus 2014 via an interface, such as a video adapter 2075. In addition to the monitor 2073, personal computers typically include other peripheral output devices (not shown), such as speakers and printers. The illustrative example shown in FIG. 20 also includes a host adapter 2078, a Small Computer System Interface (SCSI) bus 2083, and an external storage device 2076 connected to the SCSI bus 2083.

The computer system 2000 is operable in a networked environment using logical connections to one or more remote computers, such as a remote computer 2088. The remote computer 2088 may be selected as another personal computer, a server, a router, a network PC, a peer device, or other common network node, and typically includes many or all of the elements described above relative to the computer system 2000, although only a single representative remote memory/storage device 2090 is shown in FIG. 20. The logical connections depicted in FIG. 20 include a local area network (LAN) 2093 and a wide area network (WAN) 2095. Such networking environments are often deployed, for example, in offices, enterprise-wide computer networks, intranets, and the Internet.

When used in a LAN networking environment, the computer system 2000 is connected to the local area network 2093 through a network interface or adapter 2096. When used in a WAN networking environment, the computer system 2000 typically includes a broadband modem 2098, network gateway, or other means for establishing communications over the wide area network 2095, such as the Internet. The broadband modem 2098, which may be internal or external, is connected to the system bus 2014 via a serial port interface 2071. In a networked environment, program modules related to the computer system 2000, or portions thereof, may be stored in the remote memory storage device 2090. It is noted that the network connections shown in FIG. 20 are illustrative and other means of establishing a communications link between the computers may be used depending on the specific requirements of an application of the present end-to-end user experiences with a digital assistant.

Figure 21:
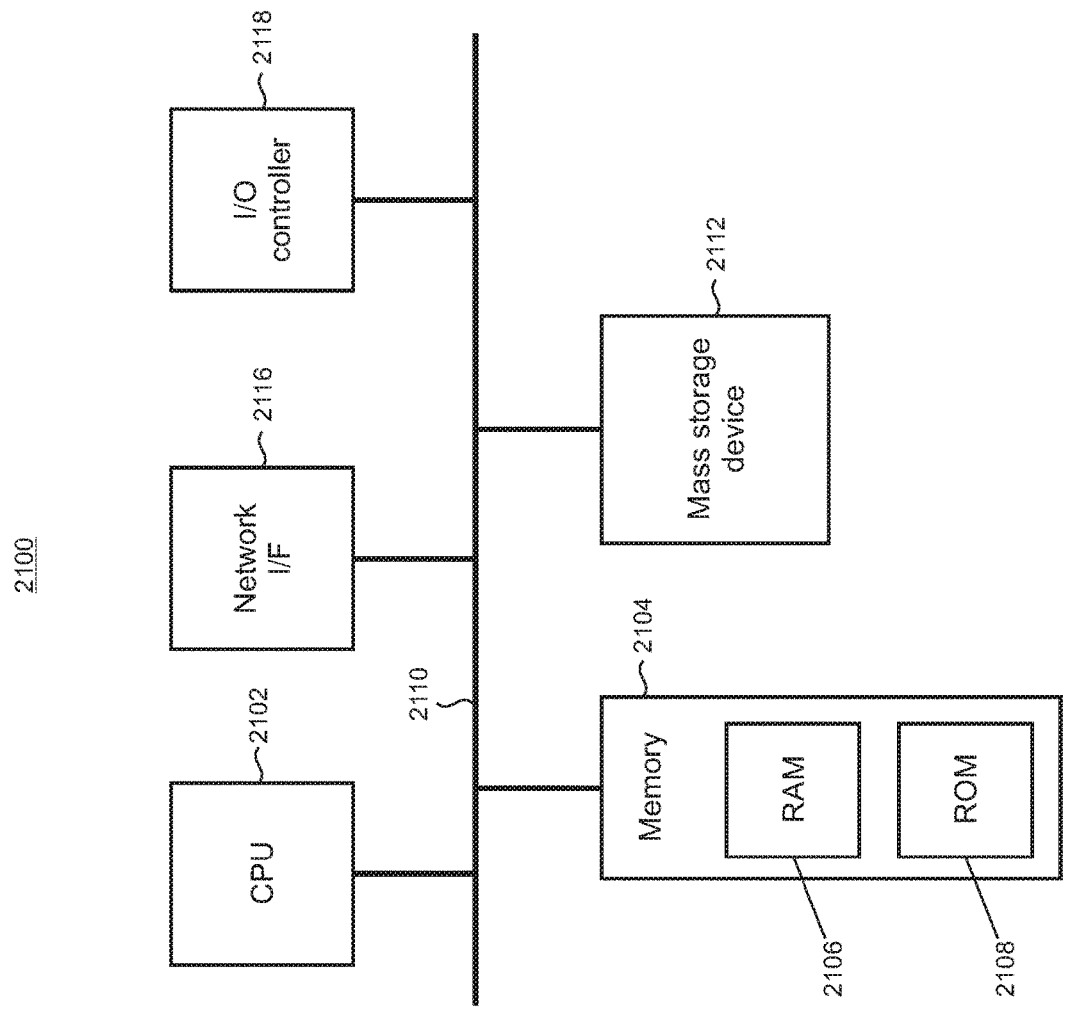
FIG. 21 shows a block diagram of an illustrative device that may be used in part to implement the present end-to-end user experiences with a digital assistant.

FIG. 21 shows an illustrative architecture 2100 for a device capable of executing the various components described herein for providing the present end-to-end user experiences with a digital assistant. Thus, the architecture 2100 illustrated in FIG. 21 shows an architecture that may be adapted for a server computer, mobile phone, a PDA, a smartphone, a desktop computer, a netbook computer, a tablet computer, GPS device, gaming console, and/or a laptop computer. The architecture 2100 may be utilized to execute any aspect of the components presented herein.

The architecture 2100 illustrated in FIG. 21 includes a CPU (Central Processing Unit) 2102, a system memory 2104, including a RAM 2106 and a ROM 2108, and a system bus 2110 that couples the memory 2104 to the CPU 2102. A basic input/output system containing the basic routines that help to transfer information between elements within the architecture 2100, such as during startup, is stored in the ROM 2108. The architecture 2100 further includes a mass storage device 2112 for storing software code or other computer-executed code that is utilized to implement applications, the file system, and the operating system.

The mass storage device 2112 is connected to the CPU 2102 through a mass storage controller (not shown) connected to the bus 2110. The mass storage device 2112 and its associated computer-readable storage media provide non-volatile storage for the architecture 2100.

Although the description of computer-readable storage media contained herein refers to a mass storage device, such as a hard disk or CD-ROM drive, it should be appreciated by those skilled in the art that computer-readable storage media can be any available storage media that can be accessed by the architecture 2100.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2100.

According to various embodiments, the architecture 2100 may operate in a networked environment using logical connections to remote computers through a network. The architecture 2100 may connect to the network through a network interface unit 2116 connected to the bus 2110. It should be appreciated that the network interface unit 2116 also may be utilized to connect to other types of networks and remote computer systems. The architecture 2100 also may include an input/output controller 2118 for receiving and processing input from a number of other devices, including a keyboard, mouse, or electronic stylus (not shown in FIG. 21). Similarly, the input/output controller 2118 may provide output to a display screen, a printer, or other type of output device (also not shown in FIG. 21).

It should be appreciated that the software components described herein may, when loaded into the CPU 2102 and executed, transform the CPU 2102 and the overall architecture 2100 from a general-purpose computing system into a special-purpose computing system customized to facilitate the functionality presented herein. The CPU 2102 may be constructed from any number of transistors or other discrete circuit elements, which may individually or collectively assume any number of states. More specifically, the CPU 2102 may operate as a finite-state machine, in response to executable instructions contained within the software modules disclosed herein. These computer-executable instructions may transform the CPU 2102 by specifying how the CPU 2102 transitions between states, thereby transforming the transistors or other discrete hardware elements constituting the CPU 2102.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture 2100 in order to store and execute the software components presented herein. It also should be appreciated that the architecture 2100 may include other types of computing devices, including handheld computers, embedded computer systems, smartphones, PDAs, and other types of computing devices known to those skilled in the art. It is also contemplated that the architecture 2100 may not include all of the components shown in FIG. 21, may include other components that are not explicitly shown in FIG. 21, or may utilize an architecture completely different from that shown in FIG. 21.

Figure 22:
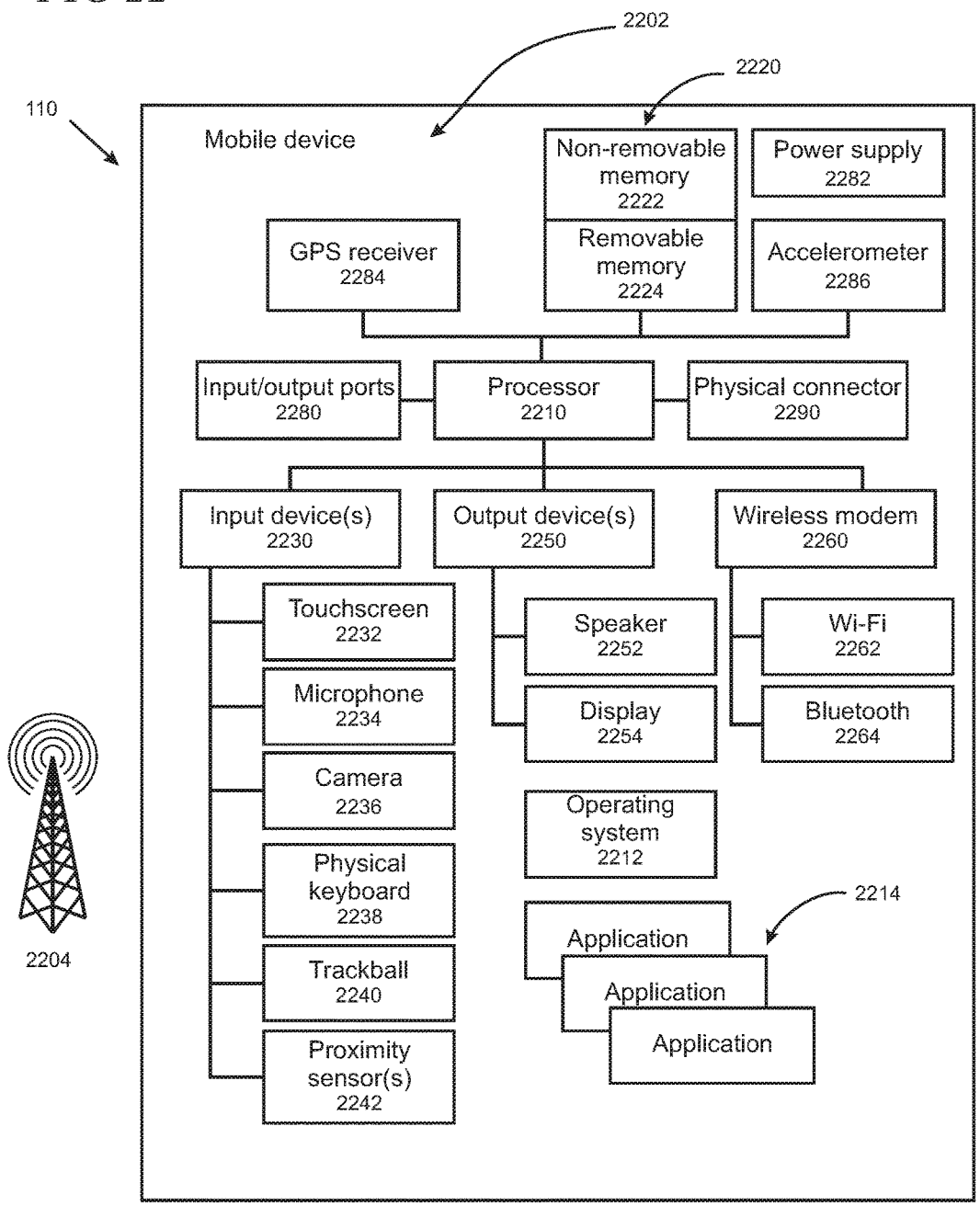
FIG. 22 is a block diagram of an illustrative device such as a mobile phone or smartphone.

FIG. 22 is a functional block diagram of an illustrative device 110 such as a mobile phone or smartphone including a variety of optional hardware and software components, shown generally at 2202. Any component 2202 in the mobile device can communicate with any other component, although, for ease of illustration, not all connections are shown. The mobile device can be any of a variety of computing devices (e.g., cell phone, smartphone, handheld computer, PDA, etc.) and can allow wireless two-way communications with one or more mobile communication networks 2204, such as a cellular or satellite network.

The illustrated device 110 can include a controller or processor 2210 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 2212 can control the allocation and usage of the components 2202, including power states, above-lock states, and below-lock states, and provides support for one or more application programs 2214. The application programs can include common mobile computing applications (e.g., image-capture applications, email applications, calendars, contact managers, web browsers, messaging applications), or any other computing application.

The illustrated device 110 can include memory 2220. Memory 2220 can include non-removable memory 2222 and/or removable memory 2224. The non-removable memory 2222 can include RAM, ROM, Flash memory, a hard disk, or other well-known memory storage technologies. The removable memory 2224 can include Flash memory or a Subscriber Identity Module (SIM) card, which is well known in GSM (Global System for Mobile communications) systems, or other well-known memory storage technologies, such as "smart cards." The memory 2220 can be used for storing data and/or code for running the operating system 2212 and the application programs 2214. Example data can include web pages, text, images, sound files, video data, or other data sets to be sent to and/or received from one or more network servers or other devices via one or more wired or wireless networks.

The memory 2220 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the device 110.

The memory 2220 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The device 110 can support one or more input devices 2230; such as a touchscreen 2232; microphone 2234 for implementation of voice input for voice recognition, voice commands and the like; camera 2236; physical keyboard 2238; trackball 2240; and/or proximity sensor 2242; and one or more output devices 2250, such as a speaker 2252 and one or more displays 2254. Other input devices (not shown) using gesture recognition may also be utilized in some cases. Other possible output devices (not shown) can include piezoelectric or haptic output devices. Some devices can serve more than one input/output function. For example, touchscreen 2232 and display 2254 can be combined into a single input/output device.

A wireless modem 2260 can be coupled to an antenna (not shown) and can support two-way communications between the processor 2210 and external devices, as is well understood in the art. The modem 2260 is shown generically and can include a cellular modem for communicating with the mobile communication network 2204 and/or other radio-based modems (e.g., Bluetooth 2264 or Wi-Fi 2262). The wireless modem 2260 is typically configured for communication with one or more cellular networks, such as a GSM network for data and voice communications within a single cellular network, between cellular networks, or between the device and a public switched telephone network (PSTN).

The device can further include at least one input/output port 2280, a power supply 2282, a satellite navigation system receiver 2284, such as a GPS receiver, an accelerometer 2286, a gyroscope (not shown), and/or a physical connector 2290, which can be a USB port, IEEE 1394 (FireWire) port, and/or an RS-232 port. The illustrated components 2202 are not required or all-inclusive, as any components can be deleted and other components can be added.

Figure 23:
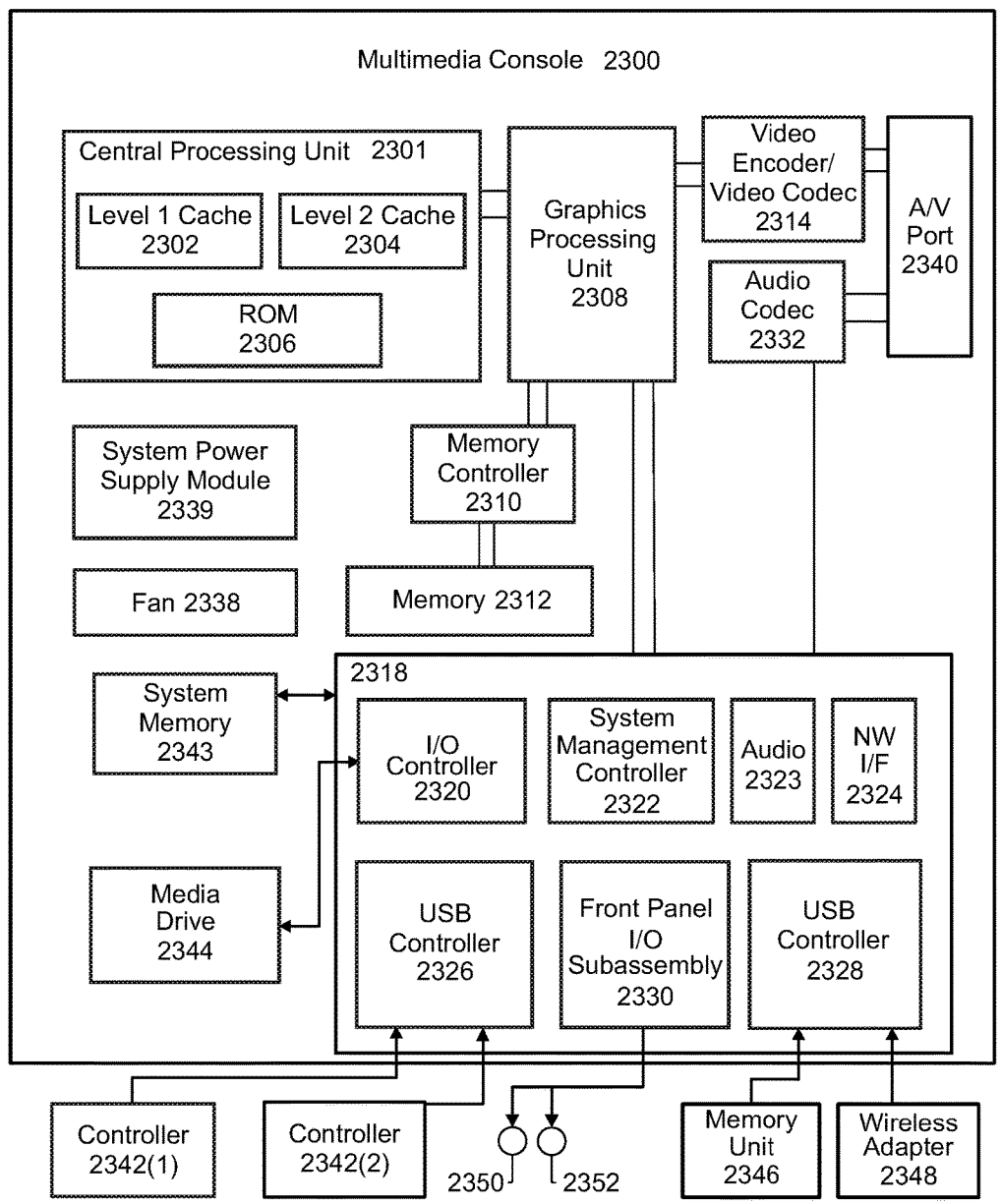
FIG. 23 is a block diagram of an illustrative multimedia console.

FIG. 23 is an illustrative functional block diagram of a multimedia console 2300. The multimedia console 2300 has a central processing unit (CPU) 2301 having a level 1 cache 2302, a level 2 cache 2304, and a Flash ROM (Read Only Memory) 2306. The level 1 cache 2302 and the level 2 cache 2304 temporarily store data and hence reduce the number of memory access cycles, thereby improving processing speed and throughput. The CPU 2301 may be configured with more than one core, and thus, additional level 1 and level 2 caches 2302 and 2304. The Flash ROM 2306 may store executable code that is loaded during an initial phase of a boot process when the multimedia console 2300 is powered ON.

A graphics processing unit (GPU) 2308 and a video encoder/video codec (coder/decoder) 2314 form a video processing pipeline for high speed and high resolution graphics processing. Data is carried from the GPU 2308 to the video encoder/video codec 2314 via a bus. The video processing pipeline outputs data to an A/V (audio/video) port 2340 for transmission to a television or other display. A memory controller 2310 is connected to the GPU 2308 to facilitate processor access to various types of memory 2312, such as, but not limited to, a RAM.

The multimedia console 2300 includes an I/O controller 2320, a system management controller 2322, an audio processing unit 2323, a network interface controller 2324, a first USB (Universal Serial Bus) host controller 2326, a second USB controller 2328, and a front panel I/O subassembly 2330 that are preferably implemented on a module 2318. The USB controllers 2326 and 2328 serve as hosts for peripheral controllers 2342(1) and 2342(2), a wireless adapter 2348, and an external memory device 2346 (e.g., Flash memory, external CD/DVD ROM drive, removable media, etc.). The network interface controller 2324 and/or wireless adapter 2348 provide access to a network (e.g., the Internet, home network, etc.) and may be any of a wide variety of various wired or wireless adapter components including an Ethernet card, a modem, a Bluetooth module, a cable modem, or the like.

System memory 2343 is provided to store application data that is loaded during the boot process. A media drive 2344 is provided and may comprise a DVD/CD drive, hard drive, or other removable media drive, etc. The media drive 2344 may be internal or external to the multimedia console 2300. Application data may be accessed via the media drive 2344 for execution, playback, etc. by the multimedia console 2300. The media drive 2344 is connected to the I/O controller 2320 via a bus, such as a Serial ATA bus or other high speed connection (e.g., IEEE 1394).

The system management controller 2322 provides a variety of service functions related to assuring availability of the multimedia console 2300. The audio processing unit 2323 and an audio codec 2332 form a corresponding audio processing pipeline with high fidelity and stereo processing. Audio data is carried between the audio processing unit 2323 and the audio codec 2332 via a communication link. The audio processing pipeline outputs data to the A/V port 2340 for reproduction by an external audio player or device having audio capabilities.

The front panel I/O subassembly 2330 supports the functionality of the power button 2350 and the eject button 2352, as well as any LEDs (light emitting diodes) or other indicators exposed on the outer surface of the multimedia console 2300. A system power supply module 2339 provides power to the components of the multimedia console 2300. A fan 2338 cools the circuitry within the multimedia console 2300.

The CPU 2301, GPU 2308, memory controller 2310, and various other components within the multimedia console 2300 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 2300 is powered ON, application data may be loaded from the system memory 2343 into memory 2312 and/or caches 2302 and 2304 and executed on the CPU 2301. The application may present a graphical user interface that provides a consistent user experience when navigating to different media types available on the multimedia console 2300. In operation, applications and/or other media contained within the media drive 2344 may be launched or played from the media drive 2344 to provide additional functionalities to the multimedia console 2300.

The multimedia console 2300 may be operated as a standalone system by simply connecting the system to a television or other display. In this standalone mode, the multimedia console 2300 allows one or more users to interact with the system, watch movies, or listen to music. However, with the integration of broadband connectivity made available through the network interface controller 2324 or the wireless adapter 2348, the multimedia console 2300 may further be operated as a participant in a larger network community.

When the multimedia console 2300 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbps), etc. Because these resources are reserved at system boot time, the reserved resources do not exist from the application's view.

In particular, the memory reservation preferably is large enough to contain the launch kernel, concurrent system applications, and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render pop-ups into an overlay. The amount of memory needed for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV re-sync is eliminated.

After the multimedia console 2300 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 2301 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 2342(1) and 2342(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches.

Various exemplary embodiments of the present end-to-end user experiences with a digital assistant are now presented by way of illustration and not as an exhaustive list of all embodiments. An example includes a device, comprising: one or more processors; a user interface (UI) configured to interact with a user of the device; and a memory device storing one or more applications and computer-readable instructions which, when executed by the one or more processors, cause the device to expose a digital assistant on the device, the digital assistant configured to determine user intentions pertaining to a user experience by monitoring user interactions with the device through the UI, receive an identification (ID) broadcast from a wireless beacon to thereby sense proximity to the wireless beacon, and operate the digital assistant to obtain an authenticated service as part of the user experience based on the sensed proximity to the wireless beacon.

In another example, the executed instructions further cause the device to receive an interaction from the user of the digital assistant using one of voice, physical interaction, or gesture. In another example, the executed instructions further cause the device to use the determined user intentions to deliver an input to an extension to an application for handling, the application extension being configured to deliver application-specific services from the application to support the user experience. In another example, the executed instructions further cause the device to render the application-specific service so that user experiences across applications are exposed to the device user as native digital assistant user experiences and whereby the application-specific service increases a size of a database of answers available to the digital assistant. In another example, the executed instructions further cause the device to map user interactions to an application extension for handling. In another example, the executed instructions further cause the device to use contextual data when performing the mapping. In another example, the contextual data comprises one or more of time/date, location of the user or device, language, schedule, applications installed on the device, user preferences, user behaviors, user activities, stored contacts, call history, messaging history, browsing history, device type, device capabilities, or communication network type. In another example, the executed instructions further cause the device to load application-specific resources from a manifest included in an application extension, the application-specific resources at least including keywords that are registered with the digital assistant. In another example, the executed instructions further cause the device to configure the digital assistant, responsively to voice input, gesture input, or manual input for performing at least one of sharing contact information, sharing a stored contact, scheduling a meeting, looking at a user's calendar, scheduling a reminder, making a call, operating a device, playing games, making purchases, taking notes, scheduling an alarm or wake-up reminder, sending a message, checking social media for updates, scraping a website, interacting with a search service, sharing or showing files, sending a link to a website, or sending a link to a resource. In another example, the authenticated service comprises granting access to a restricted resource or location.

A further example includes a method for using a digital assistant operating on a device, comprising: configuring the digital assistant to interact with a user of the device using at least one of voice, physical interaction, or sensed gesture; receiving interactions with the digital assistant from the user to implement one or more location-independent user experiences using the digital assistant; sensing proximity to a wireless transmitter that is configured to broadcast a UUID (universally unique identifier) to determine a location of the device relative to the wireless beacon; and implementing one or more location-specific user experiences using the digital assistant based on the determined location.

In another example, the method further comprises sending the UUID associated with the wireless transmitter to a remote service so that authentication of the device or a user of the device may be attempted by the remote service using the UUID. In another example, the method further comprises receiving a notification from the remote service as to success or failure of the authentication attempt. In another example, the method further comprises receiving access to a restricted resource or location based on successful authentication. In another example, the wireless transmitter is one of BLE-compliant beacon, Wi-Fi device, GNSS device, infrared device, or NFC device.

A further example includes one or more computer-readable memory devices storing instructions which, when executed by one or more processors disposed in a computer server, cause the computer server to: receive an identification (ID) associated with a wireless beacon, the ID being transmitted by a device that senses proximity to the wireless beacon by detecting the ID when broadcast by the wireless beacon, the device including a digital assistant configured to perform one or more actions based on proximity to the wireless beacon; attempt to authenticate the device or a user of the device using the received ID; and if authentication is successful, enable access to the device or user to one or more resources or locations that are restricted to only authenticated users or authenticated devices.

In another example, the authentication is performed automatically without user action. In another example, the executed instructions cause the computer server to send a notification of authentication success or authentication failure to the device. In another example, the executed instructions cause the computer server to perform challenge-response authentication. In another example, the executed instructions cause the computer server to remotely operate an entry control device.

Based on the foregoing, it should be appreciated that technologies for end-to-end user experiences with a digital assistant have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed:

1. A device, comprising:
   one or more processors;
   one or more sensors disposed in the device and configured to provide contextual data about one of the device, a user of the device, or an environment in which the device operates, at least one of the sensors being configured to perform proximity sensing relative to a wireless beacon;
   a user interface (UI) configured to interact with the device user; and
   a memory device storing one or more applications and computer-readable instructions which, when executed by the one or more processors, cause the device to
   expose a digital assistant on the device configured to support an end-to-end user experience, the digital assistant further configured to determine user intentions pertaining to the end-to-end user experience by monitoring user interactions with the device through the UI during the end-to-end user experience from initiation to conclusion, in which the digital assistant is further being configured to interoperate with the one or more sensors to thereby utilize the contextual data to interact with the user during the end-to-end user experience, in which the end-to-end user experience comprises one or more location-independent user experiences and one or more location-specific user experiences,
   receive user input at the digital assistant in which, responsive to the received user input, the digital assistant interacts with the one or more applications to perform an operation in which the digital assistant is configured to implement the one or more location-independent user experiences based at least on the interactions with the one or more applications,
   receive an identification (ID) broadcast from the wireless beacon to thereby sense proximity of the device relative to a location of the wireless beacon using only the received ID, and
   operate the digital assistant to obtain an authenticated service as part of the location-specific user experiences based on the sensed proximity to the wireless beacon.

2. The device of claim 1 in which the executed instructions further cause the device to receive an interaction from the user of the digital assistant using one of voice, physical interaction, or gesture.

3. The device of claim 2 in which the executed instructions further cause the device to use the determined user intentions to deliver an input to an extension to an application for handling, the application extension being configured to deliver application-specific services from the application to support the user experience.

4. The device of claim 3 in which the executed instructions further cause the device to render the application-specific service so that user experiences across applications are exposed to the device user as native digital assistant user experiences and whereby the application-specific service increases a size of a database of answers available to the digital assistant.

5. The device of claim 4 in which the executed instructions further cause the device to map user interactions to the application extension for handling.

6. The device of claim 5 in which the executed instructions further cause the device to use contextual data when performing the mapping.

7. The device of claim 6 in which the contextual data comprises one or more of time/date, location of the user or device, language, schedule, applications installed on the device, user preferences, user behaviors, user activities, stored contacts, call history, messaging history, browsing history, device type, device capabilities, or communication network type.

8. The device of claim 6 in which the executed instructions further cause the device to load application-specific resources from a manifest included in the application extension, the application-specific resources at least including keywords that are registered with the digital assistant.

9. The device of claim 1 in which the executed instructions further cause the device to configure the digital assistant, responsively to voice input, gesture input, or manual input for performing at least one of sharing contact information, sharing a stored contact, scheduling a meeting, looking at a user's calendar, scheduling a reminder, making a call, operating a device, playing games, making purchases, taking notes, scheduling an alarm or wake-up reminder, sending a message, checking social media for updates, scraping a website, interacting with a search service, sharing or showing files, sending a link to a website, or sending a link to a resource.

10. The device of claim 1 in which the authenticated service comprises granting access to a restricted resource or location.

11. A method for using a digital assistant operating on a device to support an end-to-end user experience, comprising:
configuring the digital assistant to interact with a user of the device during the end-to-end user experience from initiation to conclusion using at least one of voice, physical interaction, or sensed gesture, wherein the digital assistant is configured to interoperate with one or more sensors disposed in the device, the sensors being configured to provide contextual data, in which the end-to-end user experience comprises one or more location-independent user experiences and one or more location-specific user experiences;
receiving user input at the digital assistant in which, responsive to the received user input, the digital assistant interacts with applications to perform an operation in which the digital assistant is configured to implement the one or more location-independent user experiences based at least on the interactions with the applications;
sensing proximity to a wireless transmitter that is configured to broadcast a UUID (universally unique identifier) to determine a location of the device relative to the wireless beacon using only the UUID; and
implementing the one or more location-specific user experiences using the digital assistant based on the determined location and the contextual data from the one or more sensors.

12. The method of claim 11 further comprising sending the UUID associated with the wireless transmitter to a remote service so that authentication of the device or a user of the device may be attempted by the remote service using the UUID.

13. The method of claim 12 further comprising receiving a notification from the remote service as to success or failure of the authentication attempt.

14. The method of claim 13 further comprising receiving access to a restricted resource or location based on successful authentication.

15. The method of claim 11 in which the wireless transmitter is one of BLE-compliant beacon, Wi-Fi device, GNSS device, infrared device, or NFC device.

16. One or more computer-readable memory devices storing instructions which, when executed by one or more processors disposed in a computer server, cause the computer server to:
receive an identification (ID) associated with a wireless beacon, the ID being transmitted by a device that detects only the ID when broadcast by the wireless beacon and senses proximity to the wireless beacon using only the detected ID, the device including a digital assistant configured to interact with a user of the device during an end-to-end user experience from initiation to conclusion and to perform one or more actions based on proximity to the wireless beacon, the end-to-end user experience including one or more location-independent user experiences and one or more location-specific user experiences, wherein the digital assistant is configured to interoperate with one or more sensors disposed in the device and with one or more applications to provide the one or more location-independent user experiences, the sensors being configured to provide contextual data;
attempt to authenticate the device or the user of the device using the received ID; and
if authentication is successful, enable access to the device or user to one or more resources or locations that are restricted to only authenticated users or authenticated devices as part of the location-specific user experiences.

17. The one or more computer-readable memory devices of claim 16 in which the authentication is performed automatically without user action.

18. The one or more computer-readable memory devices of claim 16 in which the executed instructions cause the computer server to send a notification of authentication success or authentication failure to the device.

19. The one or more computer-readable memory devices of claim 16 in which the executed instructions cause the computer server to perform challenge-response authentication.

20. The one or more computer-readable memory devices of claim 16 in which the executed instructions cause the computer server to remotely operate an entry control device.

* * * * *